Patented Jan. 16, 1923.

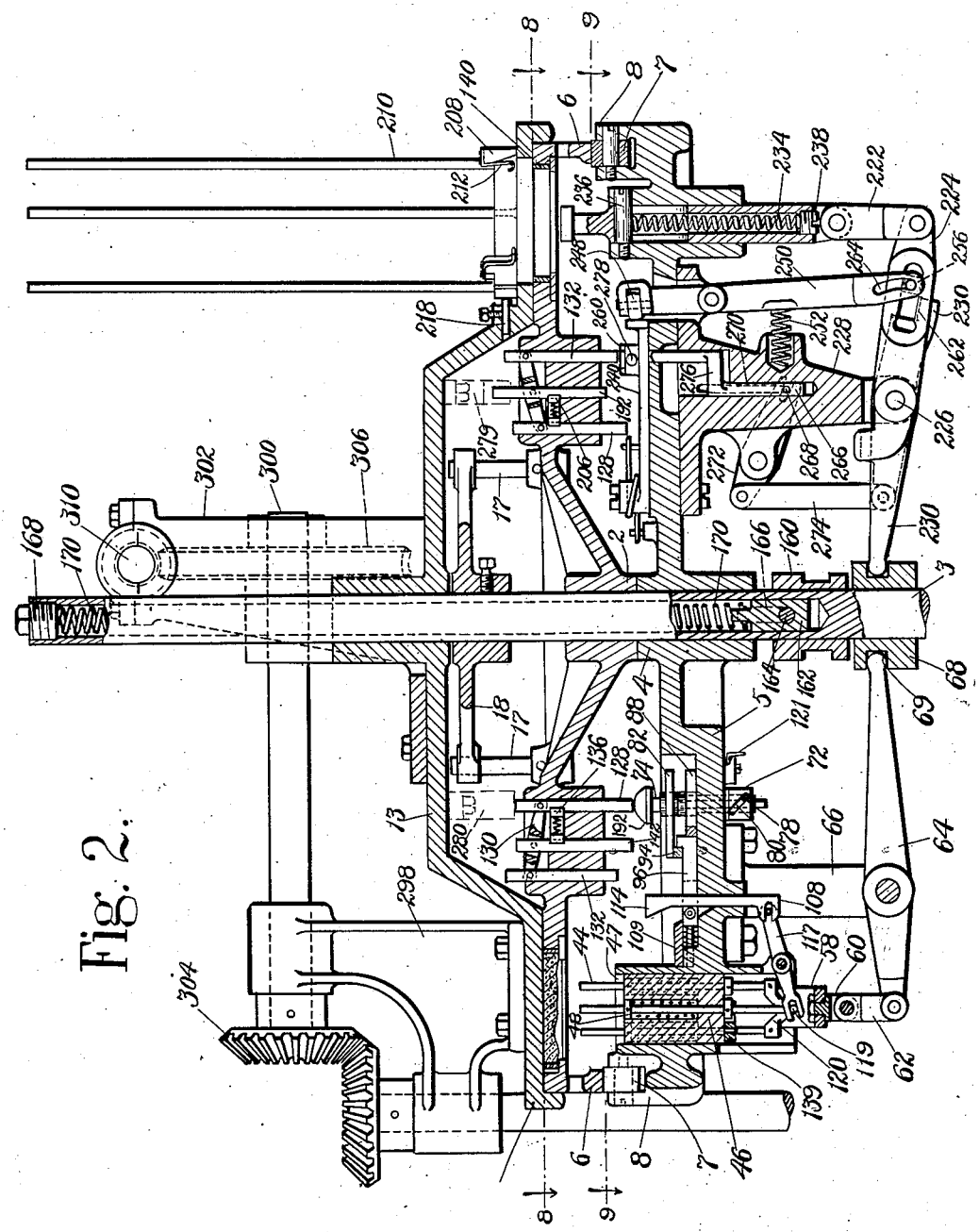

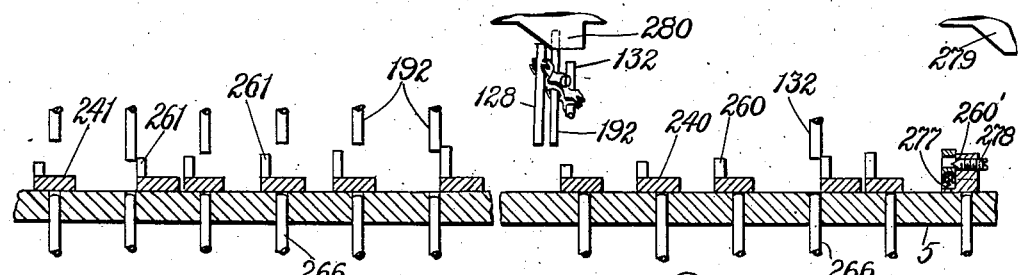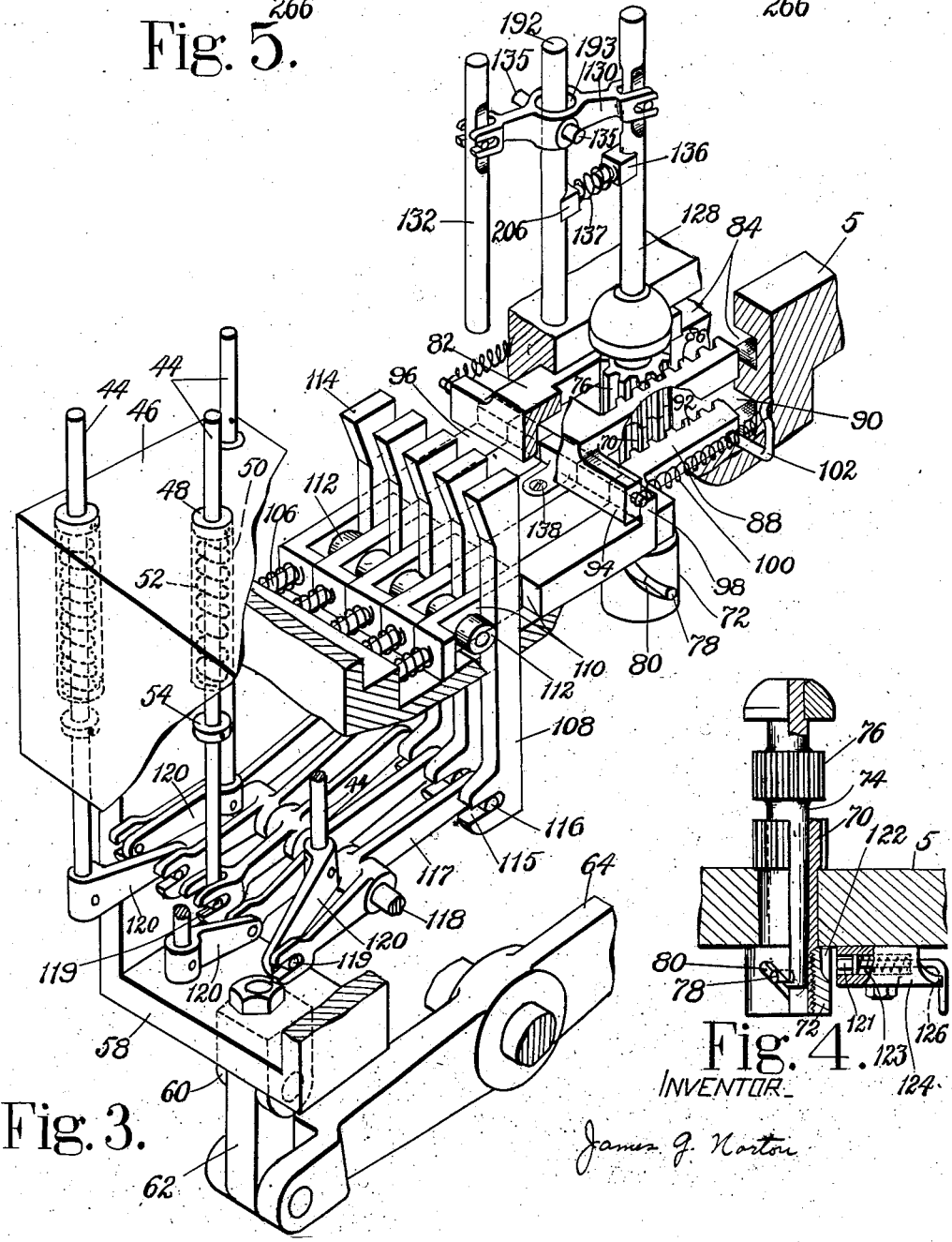

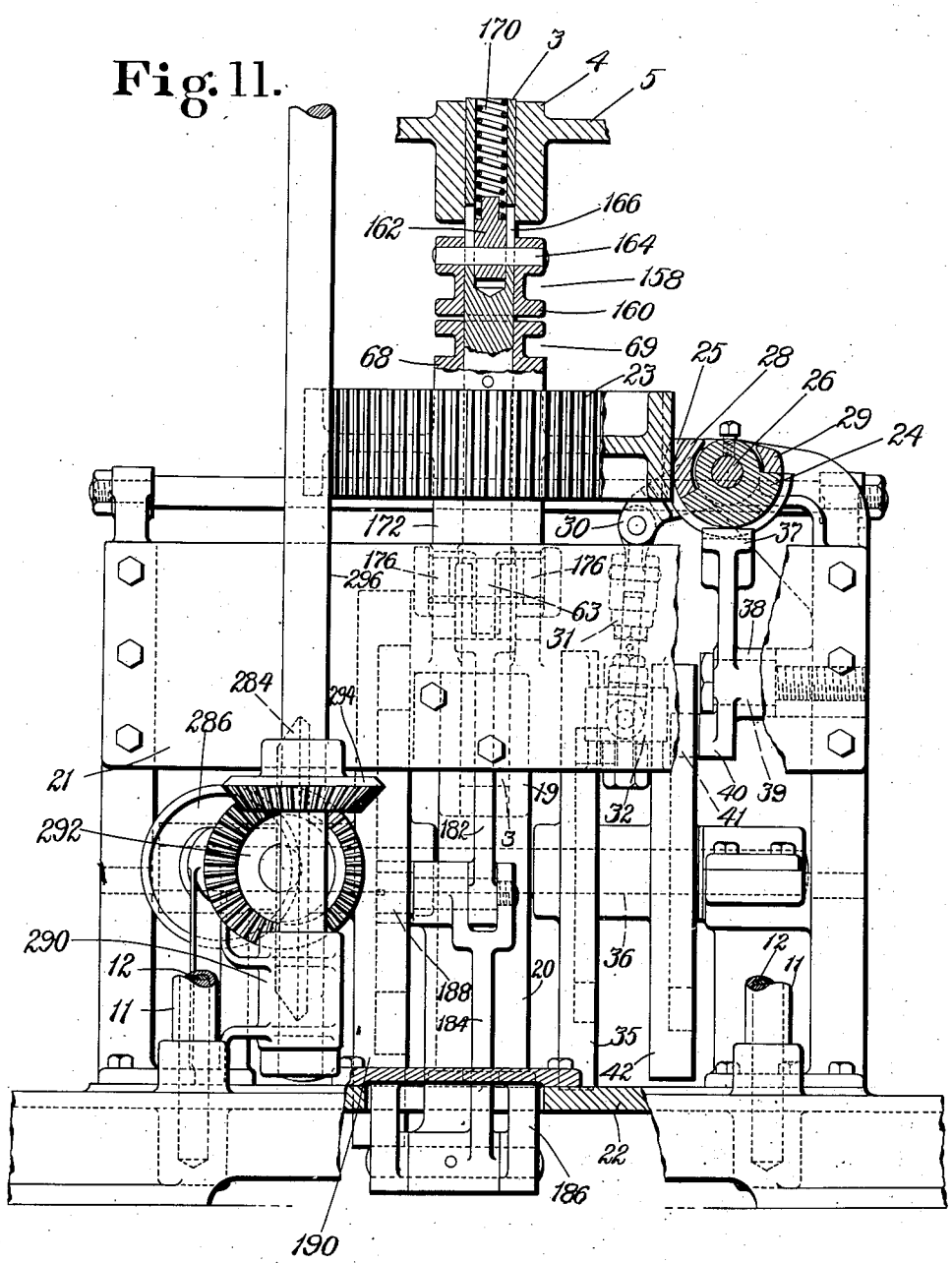

1,442,233

UNITED STATES PATENT OFFICE.

JAMES G. NORTON, OF MILTON, MASSACHUSETTS.

APPARATUS FOR TESTING AND GRADING ARTICLES.

Application filed June 24, 1920. Serial No. 391,317.

*To all whom it may concern:*

Be it known that I, JAMES G. NORTON, a citizen of the United States, residing at Milton, in the county of Norfolk and State of Massachusetts, have invented certain Improvements in Apparatus for Testing and Grading Articles, of which the following description, in connection with the accompanying drawings, is a specification, like reference characters on the drawings indicating like parts in the several figures.

This invention relates to apparatus for testing and grading articles. The invention will be hereinafter described by way of example with reference to its operation on pieces of shoe stock, for instance, heel lifts. It will be clearly apparent, however, from disclosure of the invention, that it is not limited in its application to heel lifts but that it may be employed on articles generally within wide variations in form and character.

An object of the invention is to provide improved apparatus for grading articles, such, for example, as pieces of shoe stock including heel lifts and soles. The term "grading" as used in the following description of a preferred embodiment of the invention and in the appended claims signifies operating on the articles with relation to their ascertained physical nature or condition, for example, in the case of heel lifts or soles, cutting or skiving them to render them more nearly uniform in thickness or classifying them, as by stamping them each with an appropriate symbol or separating them into groups, the individual members of each group being similar with respect to the ascertained condition, so that all the articles of one condition may be distinguished from the others.

Certain of the machines which have heretofore been devised for grading pieces of shoe stock have been designed to grade the pieces by distributing them selectively to a series of receiving stations, pieces of like thickness within determinate limits being delivered to the same station. The use of such machines for grading heel lifts enables the manufacture of heels to be made more nearly automatic than would otherwise be possible, since it facilitates the selection of a lift or lifts of the character desired in any particular instance. It is found, however, in practice, that lifts often vary greatly in thickness at different locations, and it frequently occurs that a substantially perfect lift, that is, one of substantially uniform thickness throughout is deposited by the grading machine at the same receiving station as a lift which is imperfect in such a degree as to render it practically worthless. For example, a lift that is very thick and hard on one edge and very thin and soft on the other might give the same determination at the portion of the lift engaged by the gaging element of the gaging machine as a perfect lift, in consequence of which both lifts in the case assumed would be deposited at the same receiving station. Further inspection and selection of the lifts as they come from the grading machine is, therefore, necessary before they can be incorporated into heels.

It is a further object of the invention to devise apparatus for determining the amount of variation of an article with respect to a physical characteristic of the article. Preferably, and in the present embodiment of the invention, this is effected by gaging or detecting mechanism arranged for engagement with the article, the value of the determination being exhibited by an indicator. The determination may manifestly be untilized in various ways without departing from the principles of the invention. The illustrated machine, however, is designed with a view particularly to determine the individual variations in thickness of articles and is arranged to utilize the determination to separate the articles which vary in thickness beyond a predetermined standard from articles of standard uniformity in thickness.

An important feature of the invention resides in improved article-engaging detecting mechanism and means for grading articles in accordance with their thicknesses at the thinnest spots engaged by the detecting mechanism. The detecting mechanism has associated therewith a member tending normally upon operation of the mechanism to set the grading means in accordance with the thinnest spot of the article being tested. In order to enable the grading means to be set in accordance with the variation in thickness of an article, devices are also associated with the detecting mechanism for reducing the movement of said member below normal to an extent dependent upon the greatest thickness of the article. These devices may by a simple manipulation be rendered operative or inoperative at the will of the operator to cause the articles being operated upon to be graded either in accordance with their thickness variations or in accordance with their thicknesses at their thinnest spots.

In accordance with a further feature of the invention, the detecting mechanism for measuring the individual variations in thickness of articles has associated therewith means for distributing the articles selectively in accordance with their ascertained individual thickness variations. In the illustrated machine, the detecting mechanism which, as above described, may be employed either to measure the individual thickness variations of articles or to ascertain their thicknesses at their thinnest spots comprises five gaging elements or detectors, disposed for engagement with an article at substantially evenly spaced locations. It will be understood, however, that detectors may be provided to engage an article at more or less than five points as desired within the scope of the invention. When the detecting mechanism is functional to measure the individual thickness variations of articles, they are distributed in accordance with the difference between the thickness of each at its thinnest point and that at its thickest point engaged by the gaging elements or detectors irrespective of whether the article considered as a whole is thick or thin and without regard to which of the detectors engages the thinnest point and which the thickest point of the article.

If heel lifts are first determined to be of uniform thickness within a predetermined standard and are then sorted in accordance with their actual thicknesses, their character is sufficiently ascertained to enable them to be made up into heels without further examination, except, possibly, a superficial examination of their tread faces for discoloration or other blemish. Consequently, the use of apparatus according to the present invention in connection with apparatus for sorting lifts in accordance with their thicknesses makes it possible to perform automatically all the operations involved in the classification of the lifts which require any considerable expenditure of time or trouble. A further feature of the invention resides in mechanism which will detect a physical characteristic of articles, for example, their thickness, and grade the articles in accordance with the value of the characteristic, having combined therewith means for insuring that only articles of standard uniformity, as regards the characteristic, shall be presented to the detecting means. The illustrated machine embodying this feature of the invention comprises a conveyor designed to receive heel lifts and acting to carry the lifts into position to be engaged by the detector of mechanism for grading the lifts for thickness, means being provided for removing lifts which are not of standard uniformity in thickness from the conveyor before it has advanced far enough to present them to the detector.

It is believed that it is in the interests of economy to pass lifts directly after they are dinked out and without preliminary skiving to a machine embodying those principles of the present invention pertaining to the determination of the thickness variations of the lifts. The lifts which are found to be of standard uniformity in thickness may then be passed on to the subsequent steps of their manufacture into heels without being skived. This practice results in a very considerable saving in stock and eliminates the possibility of a lift already sufficiently uniform in thickness being injured by the defective operation of the skiving machine. The distribution of the lifts in accordance with their individual thickness variations causes the lifts of non-uniform thickness to be classified in a number of groups, each group containing lifts of substantially the same thickness variation. The thickness variation of the lifts in a group having been determined, they may then readily be skived down to their thinnest points in order to render them uniform without unnecessary loss of stock. A machine which is adapted to utilize the determination of the individual variations in thickness of lifts to enable them to be thus skived is shown in my application, Serial No. 415,810 filed October 9, 1920. After the initially imperfect lifts have been skived, they may, if desired, be again tested to determine if they have actually been reduced to a uniform thickness.

The method of treating articles or blanks disclosed herein is not claimed in this application, inasmuch as it has been made the subject-matter of application, Serial No. 274,042, filed by me January 30, 1919.

Other objects and features of the invention will be apparent as the description proceeds and will be pointed out in the appended claims.

In the drawings:

Fig. 2 is a vertical sectional elevation of the upper portion of the machine, taken along the line 2—2, Fig. 7;

Fig. 3 is a view, partly in cross-section, of the detecting mechanism and the parts associated therewith for setting the grading means;

Fig. 4 is a view in detail of certain of the parts for setting the grading means;

Fig. 5 is a diagrammatic view illustrating the relative arrangement of the indicators and the levers controlled by them;

Fig. 11 is a front elevation, partly in section, of the lower portion of the machine.

Figure 1:
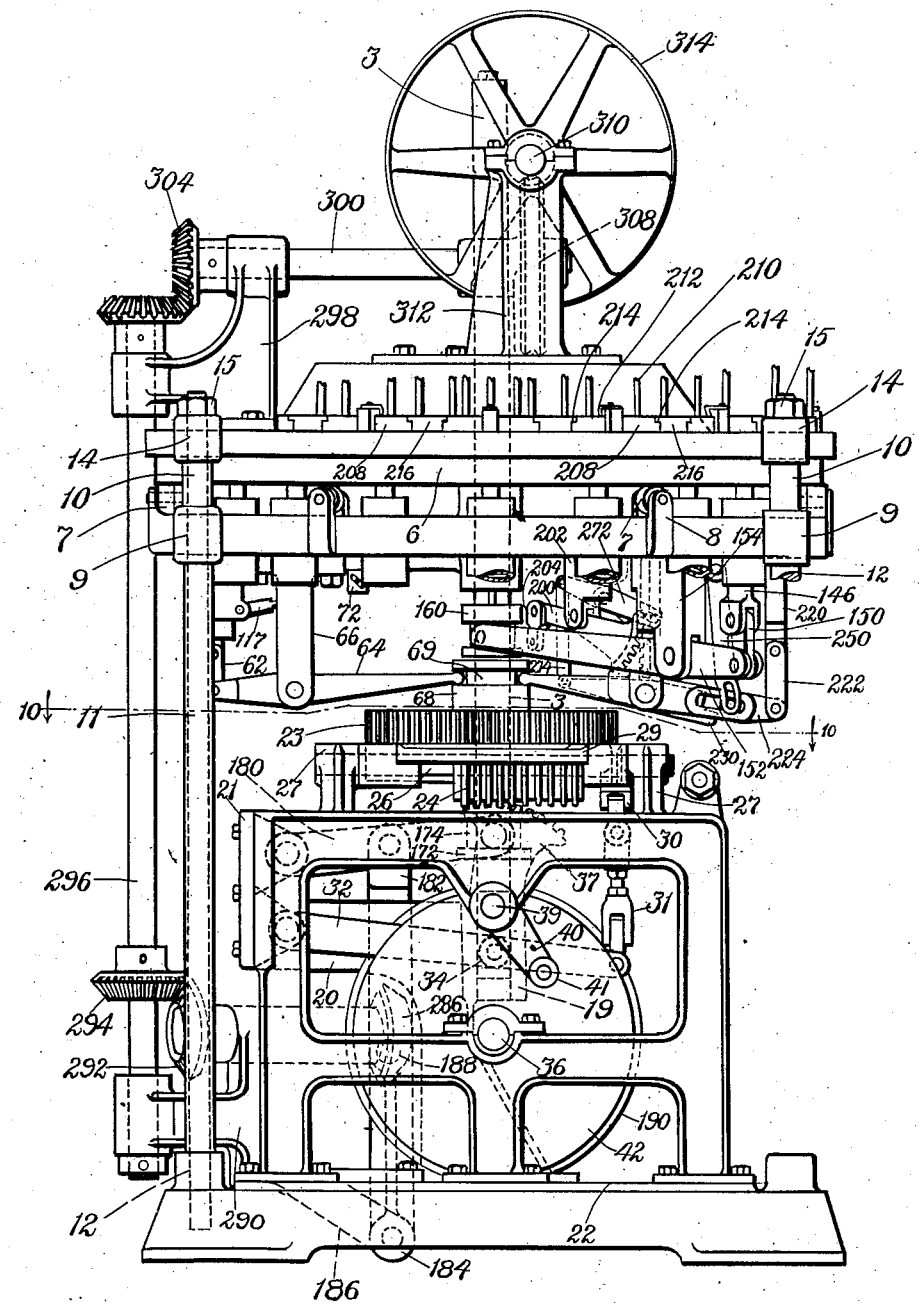
Fig. 1 is a side elevation of a machine according to the invention.

The illustrated machine comprises a conveyor in the form of a rotary, circular table 1 (Figs. 2, 6 and 8) designed particularly for operation on heel lifts and having means adjacent to its periphery for supporting the lifts, which, as best shown in Fig. 4, may be heel-lift shaped receptacles. As shown, there are sixteen of these receptacles each adapted to contain a single lift. The table 1 is intermittently rotated to register each of the receptacles, first with a "loading station"; then with a station where the lifts may be tested to determine their individual variations in thickness or to ascertain the thicknesses of the lifts at their thinnest spots; then successively with each of a series of stations at which a lift may be discharged from the table 1 and which, for convenience, will sometimes be referred to hereinafter as "storage stations"; then to a station where lifts found to be uniform in thickness within a predetermined standard may be again tested to ascertain their actual thicknesses, and, finally, to each of another series of storage stations. The table 1 is formed with a central hub 2 (Fig. 2) loosely mounted on a vertical actuator shaft 3 and supported on the upper end of a bearing 4 in a stationary plate 5. The periphery of the table 1 is also provided with a depending flange 6 which rides on a series of rolls 7 (Figs. 1 and 2) carried between lugs 8 projecting from the plate 5. The periphery of the plate 5 is formed with four bosses 9 (Figs. 1, 8 and 9) each of which is clamped between two sleeves 10 and 11 on a vertical rod 12. Above the table 1 is an upper frame member in the form of a cover plate 13 provided with four bosses 14 (Figs. 1 and 7) each of which is clamped to the sleeve 10 by a nut 15 on the upper end of the rod 12.

The cover plate 13 is formed with an opening 16 through which lifts may be introduced into the receptacles of the table 1. The opening 16 defines what may be conveniently termed a "loading station." In the operation of the machine, the table 1 is intermittently rotated in a clockwise direction (viewing Fig. 7) to register its empty receptacles with the opening 16, and each time that a receptacle is registered with the opening 16, a lift is placed in it, either by hand or by some suitable form of automatic heel lift delivering mechanism, preferably the latter.

Figure 10:
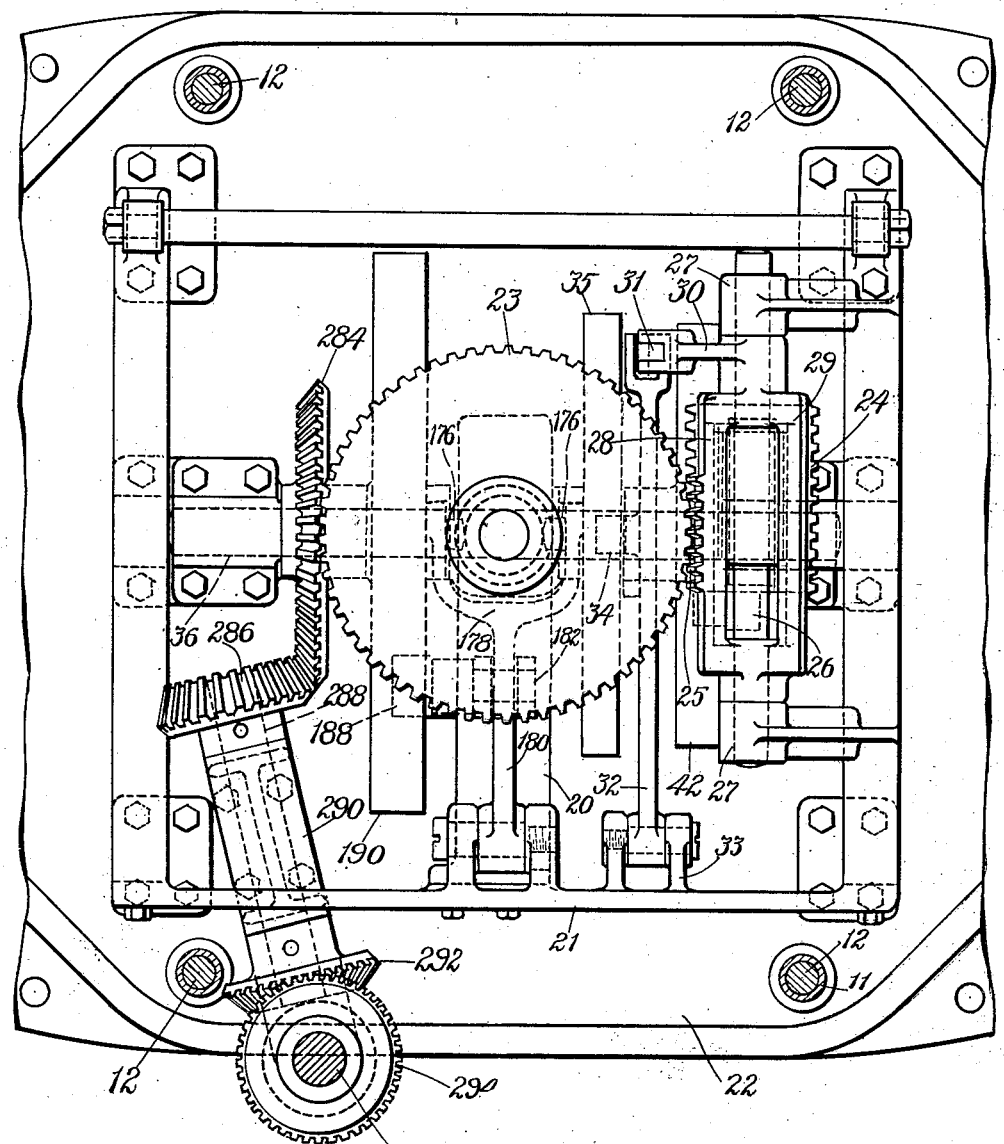
Fig. 10 is a view in plan along the line 10—10, Fig. 1.

In order to rotate the table 1 from the actuator shaft 3 to register its receptacles successively with the afore-mentioned stations, the table has upstanding therefrom three vertical pins 17 (Figs. 2, 6 and 8) slidably received in openings in a triangular spider 18 suitably secured to the shaft. The lower end of the actuator shaft 3 is supported for rotation and reciprocation in a bearing 19 (Figs. 1 and 11) formed in an angular bracket 20, one end of which is secured to a plate 21 (Fig. 10) forming one side of the square frame of the machine, and the other end of which is secured to the base plate 22 of the machine. The shaft 3 carries a gear wheel 23 which is alternately engaged by an actuating rack 24 to rotate the shaft and by a locking rack 25 to constrain the shaft against rotation. The actuating rack 24 is secured to a shaft 26 mounted to reciprocate substantially in the plane of the gear 23 through bearings 27 formed in the machine frame. The locking rack 25 is loosely mounted for rocking movement on the shaft 26, and is held from longitudinal movement on the shaft by engagement with the bearings 27. The locking rack 25 is provided with arms 28 and 29 which embrace the actuating rack 24, so that when the locking rack is rocked to lock the shaft 3 from rotary movement, the actuating rack is rocked out of engagement with the gear 23, and when the locking rack 25 is rocked to unlock the shaft 3 to permit rotary movement, the actuating rack is rocked into engagement with the gear 23.

In order to rock the locking rack 25 into and out of engagement with the gear 23 it is provided with an arm 30 which is connected, through a link 31, to an arm 32 pivotally mounted between lugs 33 formed on the plate 21. The arm 32 carries a roll 34 engaged in a groove formed in the face of a cam 35 on a cam shaft 36. Through the connections described the rack 25 is rocked to bring it and the rack 24 alternately into engagement with the gear 23.

After the actuating rack 24 has been rocked into engagement with the gear 23 in the manner described, it is reciprocated to rotate the gear 23 and impart an angular step to the table 1. To this end the rack 24 is engaged by a segment 37 (Figs. 1 and 11) formed on an arm projecting from a hub 38 pivoted on a pin 39 secured to the machine frame. Another arm 40 projecting from the hub 38 carries a roll 41 engaged in a groove formed in the face of a cam 42 on the cam shaft 36.

This type of intermittent feed constitutes in itself no part of the invention and is described and claimed in United States Letters Patent No. 1,181,091, granted April 25, 1916, on an application of Erastus E. Winkley.

Figure 7:
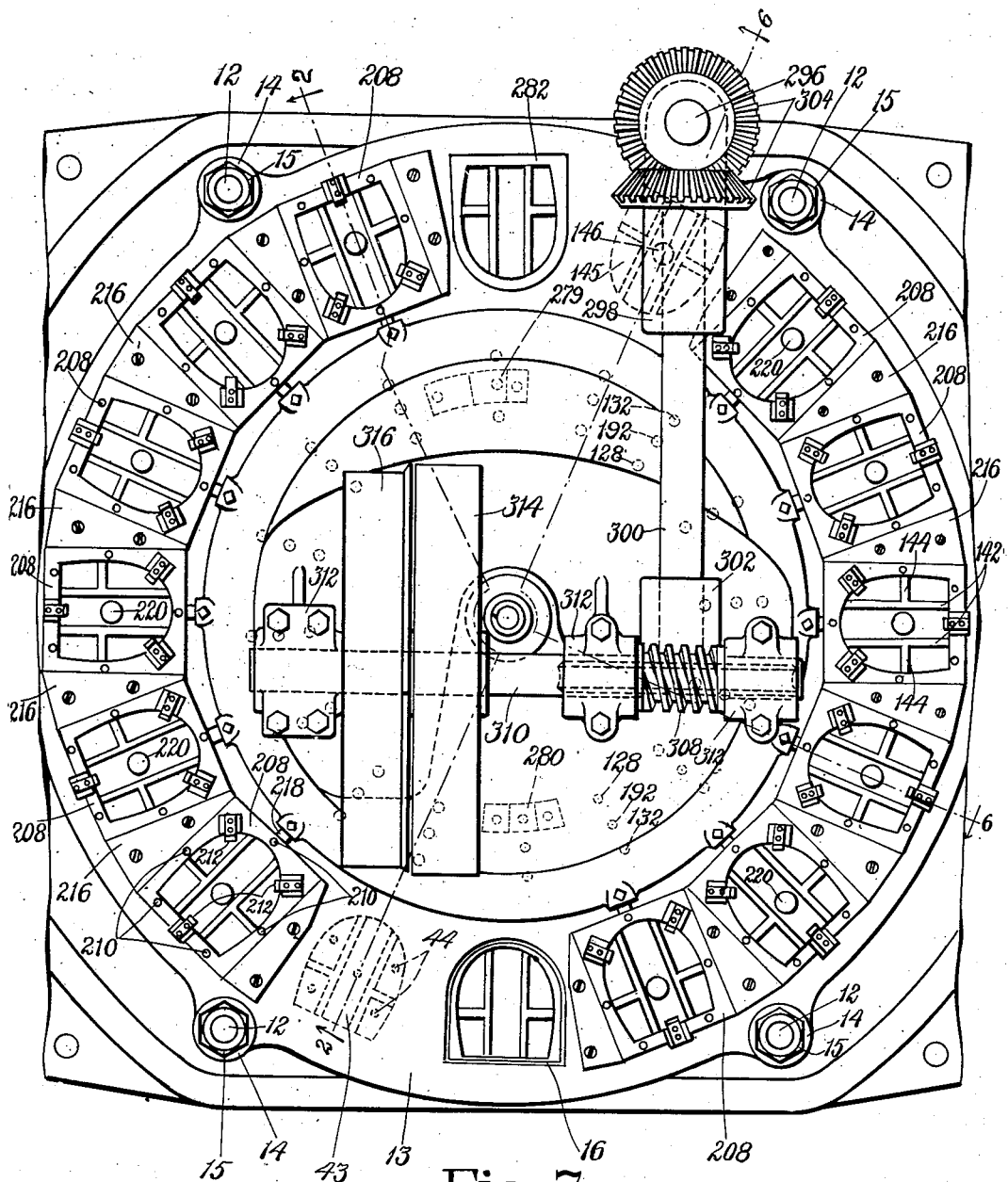
Fig. 7 is a plan view of the machine.
Figure 8:
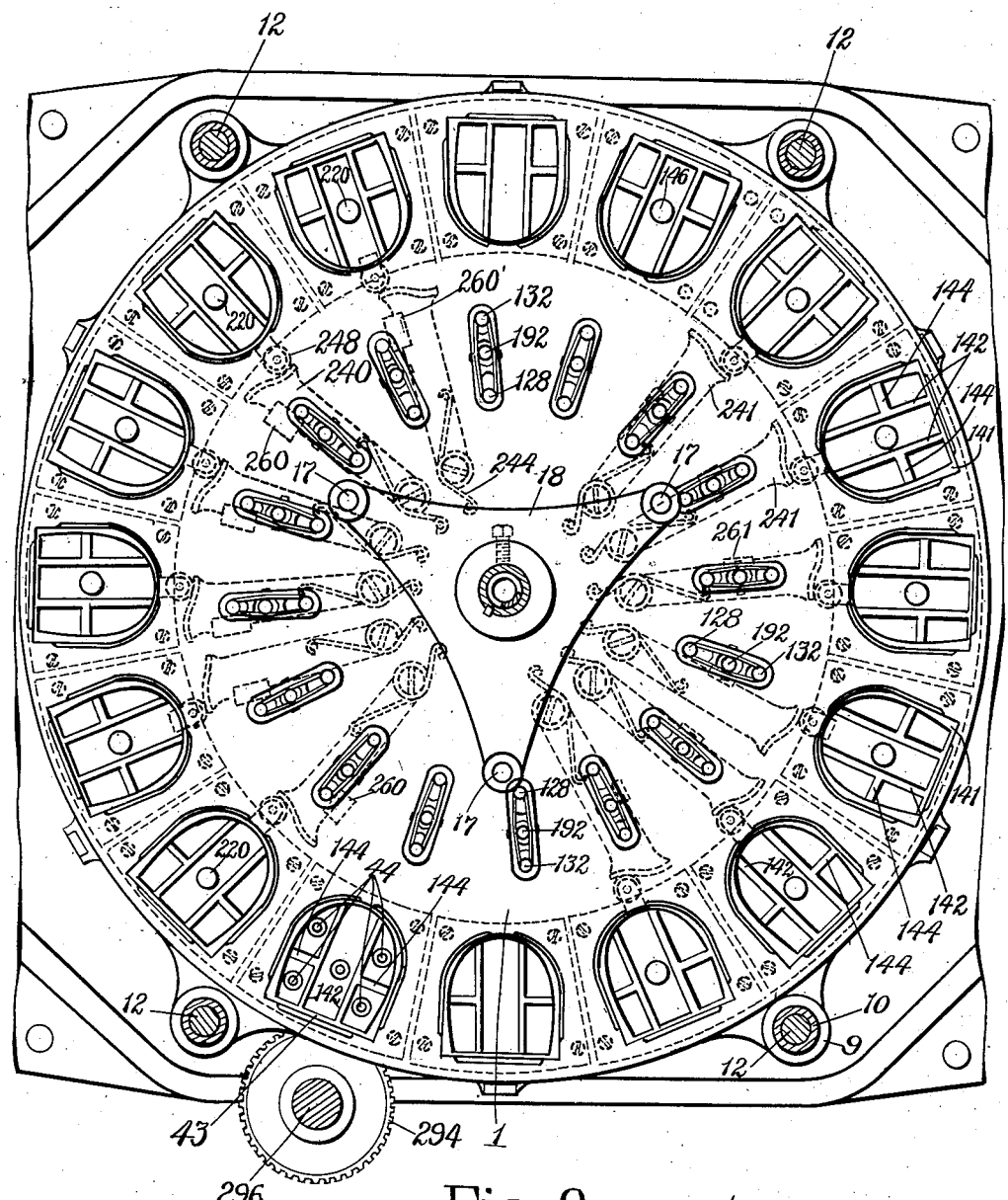
Fig. 8 is a sectional plan along the line 8—8, Fig. 2.
Figure 9:
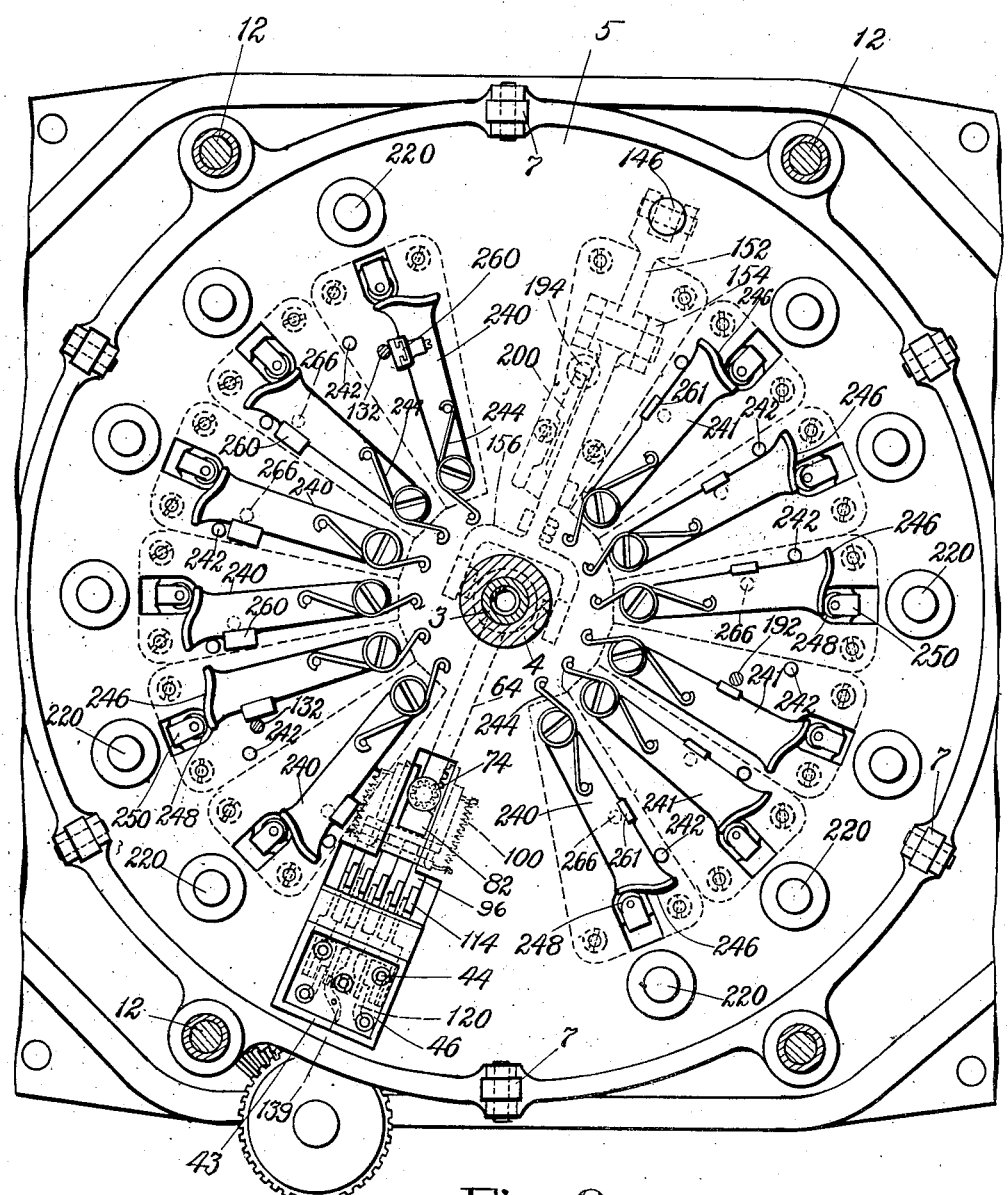
Fig. 9 is a sectional plan along the line 9—9, Fig. 2.

At each rotative step of the table 1, a lift is advanced from the loading station 16 to the first testing station indicated at 43 (Figs. 7, 8 and 9). The parts at the testing station 43 will first be described with reference to their operation to determine whether the lifts are of even or uneven thickness and the extent, if any, of their individual variations in thickness. As shown, the testing or detecting mechanism comprises a plurality of gaging elements or detectors 44 (Fig. 2) mounted in a carrier slide 46 reciprocable vertically in a guideway 47 formed on the plate 5. In the illustrated exemplification of the invention, five detectors are employed, one of which is disposed to engage a lift at a central location and the others to engage it as spaced locations about the contour edge of the lift (Fig. 8). The detectors 44 extend entirely through the carrier slide 46 from top to bottom and are provided adjacent to their upper ends with collars 48. The openings in the carrier slide 46 through which the detectors 44 pass are enlarged at their upper ends to form bores 50, and springs 52 interposed between the collars 48 and the bottoms of the bores 50 act normally to project the detectors upwardly from the carrier slide to limits determined by stop collars 54 fixed to the detectors for engagement with the under surface of the carrier slide. The springs 52 permit the detectors 44 and the carrier slide 46 to move relatively to each other, and the collars 48 serve to provide lateral support for the upper ends of the detectors and to guide them during such relative movement.

The carrier slide 46 is reciprocated vertically in the guideway 27 to raise and lower the detectors 44, and a solid portion of the cover plate 13 overlies the carrier slide and the detectors. As shown, the cover plate 13 provides an abutment having a substantially plane surface disposed at right angles to the path of movement of the carrier slide 46 and the detectors 44, and, in the operation of the machine, the lifts are gaged or tested between such surface and the detectors. It is manifest, however, that the lifts may be maintained against the action of the detectors by any suitable means constructed to engage them at points opposite from the detectors. Secured to and depending from the carrier slide 46 is a yoke 58 having fixed thereto the stem of a U-shaped member 60. A link 62 is joined at one of its ends to the member 60 and at its other end to a lever 64 fulcrumed in a bracket 66 pendant from the plate 5. The lever 64 is operated by a collar 68 fast on the actuator shaft 3, the collar 68 being formed with a groove 69 in which the end of the lever 64 is received.

Journaled in the plate 5 (Fig. 3) is a sleeved gear 70 on the lower end of which is threaded a hollow nut 72, and rotatably mounted in the gear 70 is a stud 74 provided above the gear 70 with a gear 76. From the foregoing, it will be understood that the gear 72 and stud 74 are capable of rotation both with relation to each other and to the plate 5. Fixed to the stud 74 adjacent to its lower end is a pin 78 received in an inclined slot 80 in the hollow nut 72, the construction being such that upon rotation or angular movement of the stud 74 to the left, as seen in Fig. 4, relatively to the gear 70, the stud 74 is raised to an extent proportionate to the amount of such relative movement. It will be noted, however, that angular movement of the gear 70 and stud 74 in the same direction and in equal degrees will not affect the vertical position of the stud 74.

In order to measure the variation in thickness of a lift, connections are provided between the detectors 44 and the gears 70 and 76 for causing the gears to be rotated relatively to each other upon engagement of the detectors with the lift to an extent proportionate to the difference between the maximum and minimum thickness findings of the detectors. Such connections comprise a bifurcated slide 82 mounted in channels 84 in the plate 5 and formed with rack teeth 86 disposed to engage the gear 76 and a second forked member 88 slidable in grooves 90 in the plate 5 and having teeth 92 meshing with the gear 70. The teeth on the gear 76 normally extend above the slide 82 so as to enable the stud 74 to be raised without disturbing the operative relation of the gear and the slide. Integral with the slide 82 at its forward end is a depending flange 94 having its ends extending laterally of the slide.

The slides 82 and 88 are controlled in their movements by bars 96 nested in parallelism on a depressed portion of the plate 5. As shown, the bars 96 are formed at their rear ends with upstanding lugs 98, the forward surfaces of which normally contact with the flange 94 of the slide 82 in a straight line. Springs 100 connected to the flange 94 of the slide 82 and to posts 102 on the slide 88 maintain the flange 94 and the slide 88 in engagement with the lugs 98 and the rear ends of the bars 96 respectively. With this construction, it is apparent that, if the bars 96 are moved relatively to each other, the slides 82 and 88 will be separated by a distance equal to the greatest amount of relative movement of any two of the slides. For example, if all the bars 96 are moved forwardly or to the left, as shown in Fig. 3, but some to a greater extent than others, the flange 94 and slide 82 will be positioned in accordance with the location of the lug 98 on the bar to which the maximum amount of forward movement has been imparted, whereas the slide 88 will be governed in its position by the location of the bar which has been moved to the least extent. The slides 82 and 88 are fitted closely into the channels of the plate 5 so as to preclude them from shifting laterally which might result in different movements being imparted to the slides upon equal movements of the bars 96. It will be observed that when the bars 96 are moved forwardly, the slide 82 is positively moved forwardly by them, whereas the slide 88 is caused to follow them by the springs 100, the action of the springs 100 being supplemented by friction between the stud 74 and gear 70, whereby rotation of the stud 74 tends to induce rotation of the gear 70.

The bars 96 are normally maintained in the positions shown in Fig. 3 by springs 104 coiled about studs 106 projecting from the forward ends of the bars and slidably received in openings in the plate 5, the positions of the bars being determined by actuators 108 mounted for vertical reciprocation in the plate 5. A plate 109 (Fig. 2) overlies the springs 104 and the forward ends of the bars. As shown, the actuators 108 pass through slots 110 in the bars 96 and contact with rolls 112 arranged in the slots. At their upper ends, the actuators are formed with cam portions 114 adapted upon downward movement of the actuators to impart forward movement to the bars 96 by action on the rolls 112. The body portions of the actuators 108 are of uniform cross-section so that when they are depressed, no movement of the bars 96 is effected until the rolls 112 are engaged by the cam portions 114. The actuators 108 are also substantially identical in construction to the end that downward movements of any two of the actuators of equal amounts will cause the corresponding bars 96 to be moved forwardly through equal distances. Each of the actuators 108 derives its movement from one of the detectors 44. In the illustrated construction, the lower ends of the actuators are slotted at 115 to receive pins 116 on levers 117 fulcrumed loosely on a shaft 118 supported on the plate 5. The levers 117 on the opposite side of the shaft 118 from the actuators 108 are joined by pin and slot connections 119 to the detectors 44. As shown, the central detector is directly connected to the corresponding lever 117, whereas the other detectors are provided with arms 120 by which connection is made to their respective levers. The arrangement of the arms 120 and levers 117 is such as to provide equal leverage between the detectors 44 and the actuators 108, thereby causing the actuators and the bars 96 associated with them to move equally upon equal movements of the detectors.

In the operation of the machine, the carrier slide 46 is moved upwardly by the lever 64 to engage the detectors 44 with the lower lateral face of a lift, after the receptacle containing the lift has, by movement of the table 1, been located in register with the detectors. During the upward movement of the carrier slide 46, the springs 52 maintain the detectors projected from the carrier to the full limits determined by the stop collars 54. The receptacles of the table 1 are of a depth slightly greater than the maximum thickness of the lifts to be graded so that the lifts are always elevated somewhat by the detectors against the opposed surface of the cover plate 13, and the cam portions 114 of the actuators 108 are arranged to contact with the rolls 112 substantially simultaneously with the engagement of the under surface of a lift by the detectors 44. Consequently, the cam portions 114 of the actuators 108 act on the rolls 112 while the lifts are being raised, the springs 52 being of sufficient strength to effect movement of the levers 117, actuators 108, bars 96, slide 82, and stud 74 without yielding. The carrier slide 46 is raised to a point such as to bring the ends of the detectors 44 substantially into contact with the cover plate 13 when there is no work in the machine. When, however, a lift is presented in position to be operated upon by the detectors, the movement of each detector is suspended after the detectors have engaged a lift and raised it against the cover plate with the result that the carrier slide 46 in completing its upward movement moves relatively to the detectors against the resistance of the springs 52. The extent of relative movement of the carrier slide 46 and any of the individual detectors is in direct proportion to the thickness of the lift at the point engaged by the detector, that is, the thicker the lift at the point engaged by the detector, the greater the relative movement of the carrier slide and the detector, and, conversely, the less the thickness of the lift at the point engaged by a detector, the less the extent of relative movement of said parts. Inasmuch as the table 1 is stationary while a lift is being operated upon by the detectors 44, the walls of the receptacle containing the lift prevent movement of the lift relatively to the detectors during the gaging operation.

If a relatively thin lift of uneven thickness is presented to the detectors 44, they will raise it in the receptacle containing it until it abuts against the cover plate 13. While the lift is being raised, the cam portions 114 of the actuators 108 move the bars 96 forwardly. The detector which engages the thinnest detected spot in the lift will be moved upwardly further than any of the others, and will impart to its corresponding bar 96 a greater forward movement than that imparted to any of the other bars. The slide 82, as hereinbefore indicated, is controlled with respect to its position at the end of a testing operation by the bar 96 which has the greatest forward movement. Accordingly, the slide 82 through rotation of the stud 74 and the agency of the pin and slot connection 78, 80 tends normally to cause upward movement of the stud 74 inversely proportionate to the thickness of the lift at its thinnest point, that is, the less the minimum thickness of the lift, the greater the normal upward movement of the stud 74. The tendency of the slide 82 to raise the stud 74, however, is counteracted by rotation of the sleeved gear 70 in the same direction as the stud 74, and, inasmuch as the slide 88 controlling the gear 70 is, in the case assumed, moved forwardly during the testing operation through a distance inversely proportionate to the thickness of the lift at its thickest detected point, the upward movement of the stud 74 is reduced below normal to a degree corresponding to the greatest thickness of the lift, the result being that the stud 74 is actually raised through a distance proportionate to the variation in thickness of the lift at its detected points. If desired, gearing may, of course, be introduced between the slides 82 and 88 and the gears 76 and 70 respectively to increase the amount of movement of the stud 74 in comparison with the extent of relative movement of the slides.

It will be noted that the bars 96 associated with the detectors which, in a particular instance of their operation, engage locations on a lift where the thickness of the lift is of a degree intermediate between the thickness at locations engaged by others of the detectors will be drawn away from the slide 88 at their rear ends while, at the same time, the lugs 98 on such bars will be spaced rearwardly from the flange 94 of the slide 82. Manifestly, therefore, the extent of separation of the slides 82 and 88 and the amount of upward movement imparted to the stud 74 is directly proportionate to the difference between the minimum and maximum findings of the detectors unaffected by the intermediate findings of those detectors which are thus rendered ineffective on that operation. Inasmuch as the leverage between each of the detectors 44 and its actuator 108 is the same, the limits of forward movement of the slides 88 and 82 and the extent to which the stud 74 is raised will be the same in different operations of the detectors when the maximum and minimum findings respectively of the detectors are equal regardless of which of the detectors registers the maximum and which the minimum finding.

If a relatively thin lift of substantially uniform thickness is presented to the detectors, the bars 96, upon operation of the carrier slide 46, will be moved forwardly in equal degrees. Consequently, the slide 88 controlling the sleeved gear 70 will be moved to substantially the same extent as the slide 82 and will completely counteract the tendency of the slide 82 to raise the stud 74, it being apparent that so long as the gear 70 and stud 74 are rotated or moved angularly through equal degrees and in the same direction, the pin and slot connection 78, 80 will not cause the stud to be raised.

When a relatively thick lift is operated upon, the action of the gaging mechanism is the same as in the case of a thin lift except that the slides 82 and 88 are not moved forwardly so far, and the gear 70 and stud 74 are rotated through smaller angles. Lifts of different average thicknesses but of like individual thickness variations will cause the stud 74 to be raised to the same extent.

It will be apparent from the foregoing that if the sleeved gear 70 is constrained against rotation, the stud 74 will upon each operation of the detectors 44 be elevated to a point corresponding to the thickness of the lift operated upon at its thinnest detected point. A convenient means for retaining the gear 70 stationary when desired and thus rendering the slide 88 inoperative to reduce the extent of upward movement of the stud 74, comprises a latch 121 (see Fig. 4) normally urged into a notch 122 in the nut 72 by a spring 123. The latch 121 is supported by a bracket 124 secured to the plate 5 and is formed with an outwardly inclined cam surface terminating in a notch 126, whereby through manipulation of its depending handle portion the latch may be withdrawn from locking engagement with the nut 72 and retained in such relation thereto.

The movements of the stud 74 under the control of the detectors 44 may be utilized in various ways within the scope of the invention, for example, to indicate the variation in thickness of a lift or the thickness of a lift at its thinnest detected point or to set a marker to cause the lift to be stamped in accordance with the thickness variation of the lift or its minimum detected thickness. It is manifest also that the testing or gaging mechanism hereinbefore described might be incorporated in a hand tool and the degree of upward movement of the stud 74 be rendered effective to move a pointer along the face of a dial or scale provided with appropriate symbols indicative of the thickness or the thickness variation or both of the articles to be tested. In the illustrated machine, the stud 74 is arranged to act on an element 128 of a compound indicator 130 mounted in an enlarged portion of the table 1 and comprising a second element 132 connected by a lever to the element 128 so as to cause the element 132 to move oppositely to the element 128. As shown, (Fig. 2), the table 1 is recessed on its upper side to receive the indicator lever which is pivoted on studs 135 seated in the table 1. The indicator 130 is normally maintained frictionally in any position to which it may be moved by a block 136 recessed into the table 1 and pressed against the element 128 by a spring 137. Indicators 130 are associated with each of the receptacles of the table 1 (Fig. 8), and, as the table is rotated step by step in the operation of the machine, the indicators are successively set by the gaging mechanism hereinbefore described in accordance with the determined individual thickness variations or minimum thicknesses of the lifts in the corresponding receptacles.

It is sometimes desired, as when a machine is employed on some kinds of shoe stock, for instance, soles, that the character of an article shall be determined with reference only to the portion at or near its edge. A machine constructed in accordance with the present invention may be rendered capable, when employed to measure the individual thickness variations of articles, of being operated to test only the edge portions of an article or to take into account also the character of the article at interior points by detachably mounting the lug 98 on the bar or bars 96 associated with each of the detectors disposed for engagement with an interior location on an article and removing the lugs from or replacing them on the bars according as it is desired to render such detectors inoperative or make them again operative. As shown, the lug on the bar 96 operatively connected to the central detector 44 is dove-tailed vertically on the rear end of the bar and is secured to the bar by a screw 138. Access may readily be had to the removable lug 98 and the attaching screw 138 through the space between the arms of the slide 82 by drawing the slide forwardly against the resistance of the springs 100. When the detectors 44 are employed to measure the thinnest spot of a lift, the central detector may more conveniently be rendered inoperative by interposing a swinging latch 139 (Figs. 1 and 9) between the carrier slide 46 and the stop collar 54 of the detector.

The receptacles of the table 1 comprise shells 140 which, in the present instance of the invention, are shaped in conformity with the contour of a heel lift and bottom plates 141 each consisting of an outer rim carrying two substantially parallel strips 142 disposed on opposite sides of the median line of the shelf 138 and spaced therefrom by substantially equal distances. Shorter strips 144 arranged transversely of the strips 142 bridge the spaces between the strips 142 and the adjacent sides of the rim of each of the bottom plates 141. The strips 142 and 144, accordingly, divide the space defined by the rim of the bottom plate 141 into compartments, each of which in the operation of the machine is adapted to receive one of the detectors 44 during a gaging operation.

As hereinbefore indicated, the setting of the indicators 130 in accordance with the individual thickness variations of the lifts is utilized in the illustrated machine, in the first instance, to separate the lifts of uniform thickness within the limits of a fixed standard from lifts of uneven thickness, and, in accordance with a further feature of the invention, to distribute the lifts of uneven thickness selectively in accordance with their individual thickness variations. After lifts of standard uniformity in thickness have been separated from those of uneven thickness they are presented to a station 145 (Figs. 6 and 7) where their actual thicknesses are detected. As shown, the thickness detecting mechanism comprises a solid portion of the cover plate 13 and a movable plunger 146 arranged to operate through the central compartments of the bottom plates 141 of the receptacles of the table 1. The plunger 146 reciprocates through a vertical bearing 148 formed on the plate 5, and is connected at its lower end, through a link 150, to one end of a lever 152 pivoted on a bracket 154 depending from the plate 5. The other end of the lever 152 is formed as a yoke 156, the arms of which carry rolls which engage an annular groove 158 formed in a collar 160 loosely mounted on the actuator shaft 3. The upper portion of the shaft 3 is hollow (Fig. 2) so as loosely to receive a block 162 which is secured to the collar 160 by a pin 164 (Fig. 11) passing through slots 166 in the shaft 3. Interposed between the block 162 and an adjustable plug 168 (Fig. 2) threaded into the upper end of the shaft 3 is a spring 170.

The actuator shaft 3 is alternately elevated and depressed to move the plunger 146 and the carrier slide 46 and detectors 44 away from and toward the cover plate 13. In order to impart such movement to the shaft, a collar 172 (Figs. 1 and 11), fixed to the shaft above the bearing 19, is provided with an annular groove 174 which is engaged by two rolls 176 (Figs. 1, 10 and 11) carried by a yoke 178 formed on a lever 180 pivoted to the plate 21. Intermediate between its ends the lever 180 is pivoted to the upper end of a link 182, the lower end of which is pivoted to a link 184, which, in turn, is pivoted to a bracket 186 depending from the bottom plate 22. The pivot pin connecting the links 182 and 184 is extended in the form of a roll 188 (Fig. 11) which engages a groove formed in the face of a cam 190 on the cam shaft 36. It will be observed that the links and roll 188 form a toggle which is operated by the cam 190.

The thickness detecting mechanism above described may be and, as shown, is constructed substantially as described in Letters Patent to E. E. Winkley, No. 1,234,433, granted July 24, 1917. In the machine of such patent, however, the spring corresponding to the spring 170 of applicant's construction is designed upon depression of the shaft 3 to cause the plunger 146 to compress a lift at the point engaged by it to an extent depending upon the density of the lift. In the operation of such machine, therefore, the finding of the plunger 146 takes into account both the normal thicknesses of the lifts and their densities, or, in other words, the "mass characteristics" of the lifts. To that end, the spring is made very strong in order to exert considerable pressure on the lifts. It is evident, however, that the spring 170 may be made of any desired strength, and, in the illustrated mechanism, it is comparatively weak so as not to cause the plunger 146 to compress the lifts to any appreciable extent. Consequently, the plunger 146 operates to detect the thicknesses of the lifts without substantial reference to their densities. It is evident, however, that the springs 52 controlling the detectors 44 and the spring 170 controlling the plunger 146 may, if desired, be made of a strength to take into account the density as well as the normal thickness of a lift at the points engaged by them.

The thickness characteristic of each lift as detected by the plunger 146 at the detecting station 145 is indicated by a series of vertical indicator pins 192, one of which is associated with each of the receptacles of the table 1. As shown (Fig. 3), the indicators 192 pass through openings 193 in the levers of the indicators 130. As each of the receptacles is registered with the thickness detection station 145, the indicator 192 associated with it is brought directly over a rod 194 slidably mounted in the bracket 154. The lower end of the rod is formed as a rack 196 which is engaged by a segment 198 on an arm 200 pivoted on a bracket 202 depending from the plate 5. The rear end of the arm 200 is connected through a link 204 to the rear end of the lever 152, the construction being such that when the plunger 146 is raised to detect the thickness of a lift, the rod 194 is actuated through a proportional distance to elevate the appropriate indicator 192. The indicators 192 are retained in the positions to which they have been moved by blocks 206 arranged frictionally to engage the surfaces of the indicators. As shown, each of the blocks 206 is slidably recessed in the table 1 and has one of the springs 137 interposed between it and the retaining block 136 for the corresponding indicator 130. With this arrangement of parts, the thickness indications vary inversely with the height of the indicators 192 above the plate 5, that is to say, the more the indicators are elevated by the rod 194, the less the thickness of the lift being tested, and the less the indicators are elevated, the greater the thickness of the lift.

Figure 6:
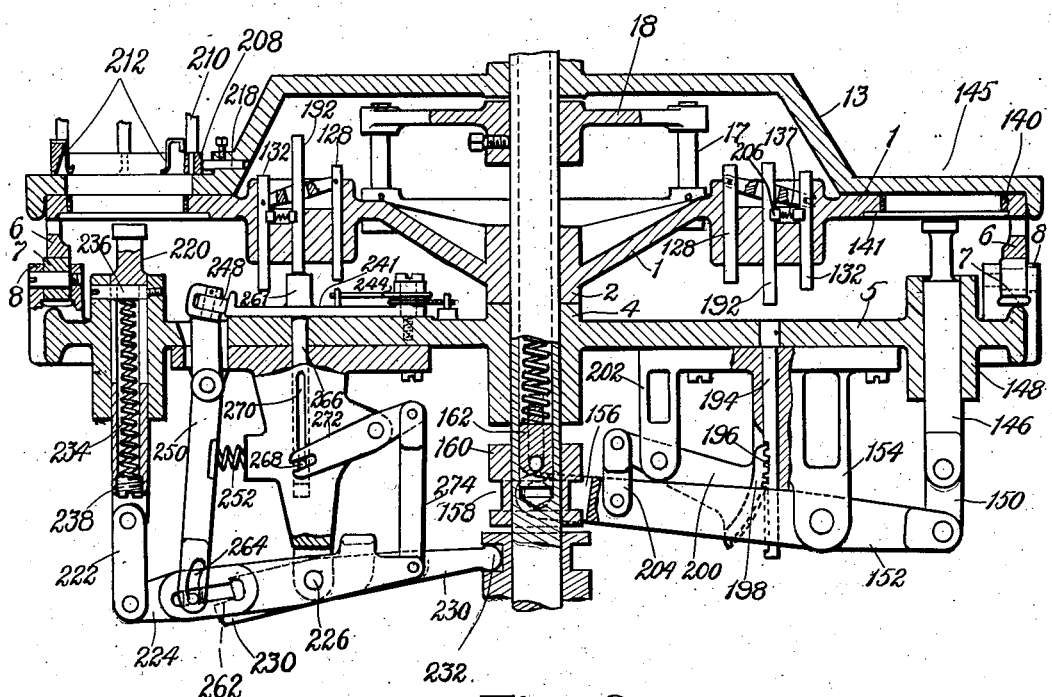
Fig. 6 is a vertical sectional elevation along the line 6—6, Fig. 7 of the upper portion of the machine, omitting the parts on the cover plate.

After a lift has been tested at either of the stations 43 or 145 and its character indicated, it is advanced to the first of a series of storage stations at which the lifts are stored face to face in stacks, shown particularly in Figs. 2, 6 and 7. These stations are arranged in two arcuate series around the periphery of the cover plate 13, which is provided with corresponding series of openings to permit the lifts to be forced upwardly from the receptacles of the table 1 into a series of lift holders above the openings. Assuming that the sleeved gear 70 is free to rotate, the lifts are distributed to the lift holders of one series in accordance with their individual thickness variations and to those of the other series in accordance with their thicknesses. As shown in Figs. 6 and 7, each lift holder consists of a plate 208 provided with a central lift-shaped opening corresponding to the shape of the openings in the cover plate 13 and the shells 138 of the receptacles of the table 1. The plate 208 carries five vertical rods 210 arranged to hold the lifts in a stack, two of the rods engaging the breasts of the lifts, two the lateral edges of the lifts, and one the backs of the lifts. The plate 208 also carries three bent spring tongues 212 which permit the lifts to be forced upwards into the holder but prevent them from dropping down out of the holder. The top edges of each plate 208 are rabbeted as at 214 (Fig. 1) and are thus permitted to slide beneath shoulders formed on the sides of triangular blocks 216 (Fig. 7), secured to the cover plate 13 between each pair of holders. This construction permits the ready removal and insertion of the lift holders when changed for variations in size of the lifts being graded. An adjustable pin 218 (Figs. 6 and 7) serves as a gage in positioning the lift holders on the machine.

The lifts are transferred from the receptacles of the table 1 to the lift-holders by a selecting or stacking mechanism comprising a series of plungers 220 (Fig. 3) carried by the plate 5, each plunger being located directly beneath a lift-holder. The plungers 220 which, because of their function may be termed lift selectors or lift stackers, pass through the central compartments of the bottom plates 141 of the lift receptacles so as to engage the lower faces of the lifts and force them upwardly between the spring tongues 212 into the holders. Each plunger 220 is mounted for reciprocation in the plate 5, and is connected at its lower end, through a link 222 to a yoked lever 224 (Figs. 2 and 6) the arms of which are pivoted on a rod 226 carried by a bracket 228 depending from the plate 5. The arms of the yoked lever 224 loosely embrace the outer end of the lever 230 pivoted on the rod 226. The other end of the lever 230 is formed as a cylinder 232 engaged in the groove 69 of the collar 68. The plunger 220 is maintained normally depressed by a spring 234 which is contained in a chamber in the plunger. As shown, a pin 236 carried by the plate 5 passes through opposed slots in the plunger and the spring 234 is interposed between the pin 236 and a plug 238 threaded into the lower end of the chamber. As the table 1 rotates, the levers 230 are rocked on the brackets 228 each time that the actuator shaft 3 is depressed, but, since the arms of the yoked levers 224 loosely embrace the outer ends of the levers 230, the plungers are normally not actuated.

The operation of the plungers 220 associated with the separate series of storage stations is controlled by the elements 132 of the compound indicators 130 and the indicators 192 respectively so that each lift is deposited in its appropriate holder. To this end, the plate 5 carries two series of pivoted levers 240 and 241 (Figs. 8 and 9) arranged to co-act respectively with the indicators 130 and 192. Each of the levers 240 and 241 is normally held pressed against a stop pin 242 by a spring 244 and is formed at its end with a cam 246 which engages a roll 248 carried on the upper end of a lever 250 pivoted on the bracket 228 (Figs. 2 and 6). A spring 252 seated in the bracket 228 and arranged to engage the lever 250, serves to hold the roll 248 pressed against the cam 246. The lower end of the lever 250 is formed as a yoke, the arms of which embrace the arms of the yoked lever 224. The arms of the yoke carry a pin 254 upon which is mounted a block 256 arranged to be reciprocated in slots 258 formed in the arms of the yoked lever 224. The levers 240 and 241 carry lugs 260 and 261 (Figs. 2, 5, 6, 8 and 9) located in the paths of the indicators 130 and 192 respectively. The heights of the lugs 260 and 261 vary, the shortest lug of each series being located on the lever for the first storage station of the corresponding series and the lugs on the levers associated with the other storage stations being stepped upwardly from the first to the last station of the series as clearly appears from Fig. 5, which shows diagrammatically the levers 240 and 241 and the lugs 260 and 261 looking toward the periphery of the table 1 and developed in a straight line. It will be remembered that the distance by which an indicator 192 or an element 132 of an indicator 130 is separated from the plate 5 indicates the thickness or the variation in thickness respectively of the lift in the receptacle with which the indicator is associated. The heights of the lugs 260 and 261 are such that, in the rotation of the table 1, an indicator strikes a lug only when the lift in the receptacle associated with the indicator is located beneath its appropriate holder and should, therefore, be deposited therein. When an indicator strikes a lug 260 or 261, the lever 240 or 241 which carries the lug is swung about its pivot, against the force of its spring 244, which causes the cam surface 246 to swing the upper end of the lever 250 outward by engagement with the roll 248. This movement of the lever 250 moves the block 256 in the slots 258 over a ledge 262 formed on the outer end of the lever 230. The plunger 220 is thus operatively connected to the lever 230, so that, when the actuator shaft 3 is again depressed, the plunger is advanced through the receptacle of the table 1, and the lift is removed therefrom and deposited in the holder. During the actuation of the plunger 220, the pin 254 travels in slots 264, formed in the yoke of the lever 250 and struck about the pivotal axis of the lever 230 as a center. It will be obvious that with the construction and arrangement described, a number of lifts which have passed the testing stations may be deposited simultaneously in different holders of the same series in the event that the thickness variation or thickness of each is different. Such a result is illustrated in Fig. 9, where the lifts at two of the storage stations to which lifts are distributed in accordance with their variations in thickness are being deposited in their respective holders. It will also be observed that lifts may be deposited simultaneously in holders belonging to the different series, this condition being also illustrated in Fig. 9.

Inasmuch as the levers 240 and 241 located at the storage stations nearest to the corresponding testing stations 43 and 145, in the direction of movement of the table 1, have the shortest lugs of their respective series, any element 132 of an indicator 130 or any indicator 192 which is positioned to actuate the selector at that station would also actuate all the other selectors. In order to move each indicator 130 or 192 out of operative or indicating position after it has operatively connected a selector to the actuator shaft 3, and thus prevent the unnecessary operation of other selectors, each bracket 228 carries a vertical rod 266 (Figs. 2 and 6) which operates through a hole formed in the plate 5. The rod 266 carries a horizontal pin 268 which projects through, and is movable in, a vertical slot 270 formed in the bracket 228. The projecting end of the pin is embraced by the forked end of a lever 272 pivoted on the bracket. The lever 272 is connected, through a link 274, to one of the arms of the yoked lever 224. Through the connections described, the rod 266 is projected upwardly through the hole in the plate 5 after the corresponding lever 240 or 241 has been turned about its pivot, which movement exposes the hole and operatively connects the mechanism for operating the selector to the actuator shaft. When the rod 266 is projected through the hole in the plate 5, it engages and raises the indicator 192 or the element 132 of the indicator 130 as the case may be, out of the range of the succeeding lugs 260 or 261. The elements 132 of the compound indicators 130 travel in a path further removed from the axis of rotation of the table 1 than is the path of movement of the indicators 192. Consequently, the rods 266 which control the indicators 130 act on the elements 132 of the indicators at a point nearer the periphery of the table 1 than the point of engagement of the corresponding rods with the indicators 192. This is provided for in the illustrated machine by forming the rods 266 which operate on the indicators 130 with two vertical portions arranged in different planes and joined by a laterally deflected portion 276 (Fig. 2).

As has already been fully explained, when the gear 70 is free to rotate the stud 74 which sets the indicator 130 is moved upwardly only in case the lift being operated upon varies in thickness at the locations engaged by the detectors 44, and, in the event that the lift being operated upon does so vary the stud 74 is moved upwards by an amount directly proportionate to the thickness variation of the lift, that is, the greater the difference in thickness of the lift at the locations engaged by the detectors, the further the stud 74 will be raised. Consequently, if the other parts of the machine were constructed and arranged as herein described, and the indicators 130 were in the form of single pins co-operating directly both with the stud 74 and the lugs 260 of the levers 240, lifts of even thickness would be deposited at the first storage station and lifts of successively greater variations in thickness would be deposited at the succeeding stations of the series. It is desired, however, that lifts of even or uniform thickness shall remain on the table 1 to be acted upon by the plunger 246 and distributed to the storage stations of the other series. Hence, each of the indicators 130 are formed to comprise oppositely moving elements 128 and 132 as described, the former co-acting with the stud 74 and the latter with the lugs 260 of the levers 240, and the highest lug 260' of the series of levers 240 is disposed so as not to be engaged by an element 132 when the receptacle with which the element is associated contains a lift of even thickness. It is frequently desirable that lifts which are not exactly uniform in thickness but are so nearly uniform as to render them fit for use without further treatment shall be distributed with lifts of even thickness. Moreover, it is sometimes advantageous to vary the standard of uniformity by which the lifts are judged. To this end, as clearly appears in Fig. 5, the lug 260' on the lever 240 most remote from the testing station 43, in the direction of rotation of the table 1, is mounted for vertical adjustment. As shown the lug 260' is normally urged upwardly by a spring 277 to a point adjustably determined by the tapered end of a pin 278 threaded into the lever 240 and provided with a groove adapted to receive a suitable tool to facilitate rotation of the pin. The lug 261 on the lever 241 of the series co-acting with the indicators 192 most remote from the thickness detecting station 145 is of a height such as to cause all the lifts which have not previously been removed from the table 1 to be deposited in the corresponding lift holder, thus preventing the return of any of the lifts to the loading station 16.

The lugs 260 of the levers 240, as will be apparent from inspection of Figs. 8 and 9, are located nearer the outer ends of the levers than are the lugs 261 on the levers 241, the arrangement being such that the lugs 260 are disposed out of the path of movement of the indicators 192 and the lugs 261 are disposed out of the path of movement of the elements 128 and 132 of the indicators 130.

The elevated indicators 192 are successively depressed to bring them into position to be operated upon by the rod 194 as the receptacles with which they are associated are moved into register with the thickness detection station 145 by a wedge-shaped block 279 depending from the cover plate 13 (see broken lines in Figs. 2 and 7). The rods 266 through their action on the elements 132 of the indicators 130 return the elements 128 of the indicators into position for operation thereon by the stud 74. In order to insure, however, against misplacement of the indicators 130 when they are registered with the stud 74, a second wedge-shaped block 280 is disposed for engagement with the elements 128 to depress them, if necessary, previous to the movement of the receptacles with which they are associated to the testing station 43.

In order to enable lifts which have been ascertained to be of uneven thickness and have been treated to reduce them to uniform thickness to be sorted for thickness without being again tested for uniformity in thickness, and to enable lifts, if desired, to be gaged for thickness without being previously tested for uniformity, I have provided a second loading station 282 formed by an opening in the cover plate 13 and disposed between the first series of lift holders and the thickness detection station.

In order to drive the machine from some suitable source of power, the cam shaft 36 carries a bevel gear 284 (Fig. 10) which meshes with a similar gear 286 secured to one end of a short shaft 288, journaled in a bracket 290 carried by the base plate 22. A bevel gear 292 secured to the other end of the shaft 288 meshes with a bevel gear 294 secured to a vertical shaft 296 journaled at one end in the bracket 290 and at the other end in a bracket 298 (Figs. 1 and 2) secured to the cover plate 13. The shaft 296 is driven from a shaft 300, journaled at one end in the bracket 298 and at the other end in a bracket 302 (Fig. 7) secured to the plate 13, through bevel gears 304 secured to the ends of the shafts 296 and 300. The shaft 300 carries a worm gear 306 (Figs. 2 and 7) which is driven by a worm 308 on a driving shaft 310 journaled in brackets 312 on the cover plate and provided with fast and loose pulleys 314 and 316.

The manner of operation of the illustrated machine will now be described, it being assumed, in the first instance, that the machine is being employed to separate from a quantity of lifts those of uneven thickness; to distribute such lifts selectively in accordance with their individual thickness variations; and to distribute selectively lifts of substantially uniform thickness in accordance with their actual thicknesses. Lifts vary in thickness under ordinary factory conditions through a range of from five to twelve irons, "iron" being a term frequently employed in the art of shoe-making to denote measurements of 1/48 of an inch. The receptacles of the table 1 are preferably deep enough to receive lifts of the maximum thickness which it is desired that the machine should be employed to operate upon, and, in the following description of the operation of the machine, the receptacles will be assumed to be of a depth of twelve irons. In the use of the machine, lifts are successively introduced singly into the receptacles of the table 1 at the loading station 16 and are, upon step-by-step rotation of the table 1 in a clockwise direction (Fig. 7), successively presented to the testing station 43. The table 1 is locked against rotation while a lift is being tested or gaged by the detectors 44. The detectors are moved upwardly to perform a gaging operation and raise the lift being operated upon against the opposed surface of the cover plate 13. At the same time, the detectors through the levers 117, actuators 108, bars 96, and slide 82 rotate the stud 74 to an extent corresponding to the thickness of the lift at the thinnest spot engaged by the detectors and thus tend through the pin and slot connection 78, 80 commensurately to raise the stud 74. When the machine is being used to measure the thickness variations of lifts, however, the sleeved gear 70 is unlocked and is rotated, under the control of the slide 88 in the same direction as the stud 74, thereby reducing the upward movement of the stud 74 by an amount proportionate to the greatest thickness of the lift, the result being an upward movement of the stud 74 commensurate with the detected thickness variation of the lift. For example, if a lift presented to the detectors 44 is six irons thick at its thinnest detected spot, and has a maximum thickness of nine irons, the stud 74, upon operation of the detectors is rotated by the slide 82 through a distance corresponding to movement of the detectors through a range of six irons, inasmuch as the receptacles of the table 1 have a depth of twelve irons and the cam portions 114 of the actuators 108 are arranged to actuate the bars 96 during movement of the detectors upwardly from the level of the bottoms of the receptacles. The sleeved gear 70, however, is rotated through a distance corresponding to movement of the detectors through a range of three irons, inasmuch as the detector engaging the thickest spot of the lift is moved upwardly from the bottom of the receptacle through a distance of three irons. Accordingly, in the case assumed, the stud 74 is raised by an amount commensurate with movement of the detectors through a range of three irons. If, on the other hand, a lift presented to the detectors 44 has a thickness of seven irons at its thinnest detected spot and a thickness of ten irons at its thickest point, the slide 82, upon operation of the detectors, is moved forwardly through a distance corresponding to a five-iron movement of the detectors and tends to raise the stud 74 to a degree corresponding to such movement. The sleeved gear 70, however, in the case assumed, is rotated through a distance corresponding to a two-iron movement of the detectors and commensurately reduces the upward movement of the stud 74 by the slide 82, the result being a differential movement of the stud 74 and sleeved gear 70 and consequent upward movement of the stud 74 corresponding to movement of the detectors through a distance of three irons. It will be understood from the foregoing that a lift which has a thickness of six irons at its thinnest spot and a maximum thickness of nine irons causes the stud 74 to be raised to the same extent as a lift which is seven irons thick at its thinnest spot and ten irons thick at its thickest point. From the above, it will also be manifest that so long as the sleeved gear 70 is free to rotate, the tendency of the slide 82 to raise the stud 74 through a distance corresponding to the thinnest spot of the lift being tested is counter-acted, in whole or in part, by movement of the sleeved gear 70 under the control of the slide 88 through a distance corresponding to the maximum thickness of the lift, so that the extent of upward movement of the stud 74 is always proportionate to the difference in thickness of a lift at the detected points without reference to the actual dimensions of the lift.

As the lifts in the receptacles of the table 1 are successively presented for operation thereon by the detectors 44, the elements 128 of the compound indicators 130 are disposed over the stud 74 so that the indicator associated with each receptacle will be positioned by the stud 74 in accordance with the thickness variation of the lift in the receptacle. After the lifts have been tested at the station 43, they are moved by step-by-step rotation of the table into register with each of a series of storage stations, six of such stations being shown in the drawings. As the table 1 rotates, the lugs 260 on the levers 240 associated with the storage stations are engaged by the elements 132 of the compound indicators 130 selectively in accordance with the positions in which the indicators have been set by the testing mechanism. Inasmuch as the lugs 260 on the levers 240 are stepped progressively higher in the direction of rotation of the table 1, the lever at the first storage station, that is, the one adjacent to the testing station 43, will be operated only by the indicators associated with receptacles containing lifts of the greatest thickness variation, whereas the remaining levers of the series will be operated by indicators 130 associated with receptacles containing lifts of successively less variation. After an element 132 of the detector 130 has engaged and operated a lever 240, thus causing the selecting plunger 220 to be rendered operative to deliver the lift at the corresponding storage station, the element is raised by the appropriate rod 266 so as to render it inoperative on the remaining levers 240. The lugs 260 on the levers 240 may conveniently be arranged at such a height as to cause lifts of a thickness variation of five irons to be delivered at the first storage station and to cause lifts of thickness variations of four irons, three irons, two irons and one iron to be delivered to the succeeding storage stations in regular order. The lug 260' on the lever 240 associated with the last storage station of the series determines by its height the standard whereby the lifts are judged, since, if the element 132 of an indicator 130 is set by the stud 74 so as not to engage the lug 260' or any of the preceding lugs, the corresponding lift will not be delivered to any one of that series of storage stations but will be permitted to pass on to the thickness detecting station 145. With the illustrated construction, the standard of uniformity of the lifts may be determined adjustably by adjustment of the lug 260', it being plain that the higher the lug is positioned, the more nearly uniform a lift must be in order to be passed on to the thickness detecting station. The last storage station of the series, therefrore, will receive lifts grading downwardly from a thickness variation of one iron to zero or any intermediate amount depending upon the vertical position of the adjustable lug 260'.

In the continued rotation of the table 1, the lifts in the receptacles of the table are successively presented in the field of action of the thickness detecting plunger 146 (Fig. 6), which causes the indicators 192 associated with the receptacles containing the lifts to be elevated by the rod 194 through distances commensurate with the ascertained thicknesses of the lifts. The lifts are then advanced by rotation of the table 1 successively into register with each of a second series of storage stations, six of these being shown on the opposite side of the machine from the first series of storage stations. The indicators 192 actuate the levers 241 associated with the storage stations of the second series in accordance with the positions in which the indicators have been set thereby causing the lifts to be distributed to the storage stations of the series in accordance with their thicknesses. After an indicator 192 has engaged the lug 261 on one of the levers 241, thereby causing the appropriate lift to be delivered to the corresponding storage station, the indicator is rendered inoperative on any of the other levers 241 by a rod 266 in the manner heretofore described with reference to the indicators 130.

When it is desired to utilize the machine to distribute lifts in accordance with their thicknesses at their thinnest spots, the handle portion of the latch 121 is turned toward the observer (Fig. 4) thereby causing the end of the latch to enter the notch 122 in the nut 72, thus constraining the sleeved gear 70 against rotation and rendering the slide 88 inoperative to reduce the upward movement of the stud 74 under the action of the slide 82. Consequently, in the subsequent use of the machine, the stud 74 will be elevated upon each operation of the detectors 44 to a degree corresponding to the thickness of the lift at the thinnest spot engaged by the detectors. If, therefore, a lift is presented to the detectors which is seven irons thick at its thinnest spot, the stud 74 will be rotated and raised through a distance corresponding to movement of the detectors through a range of five irons, whereas if a lift has a minimum thickness of eight irons or nine irons or ten irons, the stud 74 will be raised through distances corresponding to movement of the detectors through ranges of four irons, three irons and two irons respectively, it being remembered that the receptacles of the table 1 have a depth of twelve irons. If, therefore, it be assumed that the lugs 260 on the levers 240 are so arranged that when the sleeved gear 70 is free to rotate, lifts of individual thickness variations of five irons, four irons, three irons, two irons and one iron are distributed at the respective storage stations, it follows that if the sleeved gear 70 is constrained against rotation in order to permit the lifts to be measured with reference to their thinnest spots, all lifts of a thickness at their thinnest spots less than seven irons will be delivered to the first storage station, and lifts having thicknesses at their thinnest spots of eight irons, nine irons, ten irons and eleven irons respectively will be delivered to the succeeding storage stations. When the machine is used to distribute lifts in accordance with their thinnest spots, it is usually not desired that any of the lifts being tested be operated upon at the testing station 145. Consequently, the lug 260' is preferably elevated to a point such that it will be engaged by the elements 132 of the compound indicators 130 regardless of whether the elements 128 of the indicators 130 are raised by the stud 74.

Having fully described my invention, what I claim as new and desire to secure by Letters Patent of the United States is:—

1. In a machine of the class described, means for determining the individual variation in thickness of each of a plurality of articles and means for sorting the articles in accordance with the values of the determinations.

2. In a machine of the class described, means for determining the variation in thickness of an article at a plurality of points regardless of whether the article is relatively thick or thin at any of such points and means for indicating the value of the determination.

3. In a machine of the class described, means for determining the individual variations in thickness of articles at a plurality of points regardless of whether the articles are relatively thick or thin at any of such points and means for grading the articles in accordance with the values of the determinations.

4. In a machine of the class described, means for determining the amount of variation of an article in respect of a physical characteristic of the article, and means for directly indicating the value of the determination.

5. In a machine of the class described, means for determining the individual variation of each of a plurality of articles with respect to a physical characteristic of the article, and means for separating articles which vary as to said characteristic beyond a predetermined standard from articles which are of standard uniformity as regards the characteristic.

6. In a machine of the class described, devices for detecting a characteristic of an article at spaced locations, and means for giving a unitary indication of the degree of difference between the findings of the devices.

7. In a machine of the class described, devices for detecting the thickness of an article at spaced locations, and means for indicating the degree of difference between the findings of the devices, regardless of whether the article is relatively thick or thin at any of the points engaged by the devices.

8. In a machine of the class described, mechanism for testing an article comprising a plurality of movable detectors, means for operating the detectors, an indicator, and means for setting the indicator in accordance with the relation between the findings of the detectors.

9. In a machine of the class described, a plurality of movable detectors disposed for engagement with an article at spaced locations, means for operating the detectors, and means for grading articles in accordance with the degree of difference between the findings of the detectors.

10. In a machine of the class described, a plurality of movable detectors disposed for engagement with an article at spaced locations, means for operating the detectors, a conveyor for the articles, and means for separately discharging from the conveyor articles which vary with respect to the degree of difference between the findings of the detectors.

11. In a machine of the class described, a plurality of detectors disposed for engagement with an article at spaced locations to ascertain the thickness of the article, means for operating the detectors, and means for distributing the articles in accordance with the degree of difference between the maximum and minimum findings of the detectors.

12. In a machine of the class described, a number of detectors greater than two disposed for engagement with an article at spaced locations to ascertain a characteristic of the article, and means for grading articles in accordance with the degree of difference between the maximum and minimum findings of the detectors, constructed to be unaffected by the intermediate findings of the detectors.

13. In a machine of the class described, a number of detectors greater than two for ascertaining the thickness of an article at spaced locations, each of the detectors being adapted to register a miximum or minimum finding, and means for grading articles in accordance with the maximum and minimum findings of the detectors, regardless of which of the detectors registers the maximum and which the minimum finding and of the intermediate findings of the other detectors.

14. In a machine of the class described, a number of detectors greater than two for ascertaining the thickness of an article at spaced locations each of the detectors being adapted to register a miximum or minimum finding, an indicator, and means controlled by the detectors for locating the indicator in the same position when the degree of difference between the maximum and minimum findings is the same, regardless of which of said detectors registers the maximum and which the minimum finding.

15. In a machine for operating on articles some of which are tapered as to certain of their dimensions, mechanism for testing the articles, and means for separating the tapered articles from those of substantial uniformity in the dimension regardless of the relation in which the tapered articles are presented to the testing mechanism.

16. In a machine for operating on articles some of which are tapered as to certain of their dimensions, mechanism for testing the articles, and means for grading the articles in accordance with the degree of taper of the articles regardless of the relation in which the articles are presented to the testing mechanism.

17. In a machine for grading flat articles such as pieces of shoe stock and the like, grading means, and means constructed and arranged to be rendered operable at the will of the operator to set the grading means either in accordance with the thickness variation of an article at a plurality of points disposed both adjacent to the edge of the article and interiorly of the article or in accordance with points adjacent to the edge of the article only.

18. In a machine of the class described, a plurality of spring-pressed plungers, means for constraining an article against movement in the direction of movement of the plungers, means for operating the plungers constructed and arranged to permit the movements of the plungers to be discontinued against the pressure of the springs upon engagement of the individual plungers with an article interposed between the plungers and the constraining means, and means for indicating the difference between the maximum and minimum amounts by which the movements of the plungers are reduced below normal by the article.

19. In a machine of the class described, a plurality of spring-pressed plungers, an abutment, means for operating the plungers constructed and arranged to permit the movements of the plungers to be discontinued against the pressure of the springs upon engagement of the individual plungers with an article interposed between the plungers and the abutment, and means for grading articles with reference to the extent to which movement of the plungers is reduced below normal by the articles.

20. In a machine of the class described, detecting mechanism comprising a plurality of plungers, a carrier for the plungers, springs operable to project the plungers from the carrier, an abutment for constraining an article against movement in the direction of movement of the plungers, a series of receptacles movable to interpose articles successively between the plungers and the abutment, means for operating the carrier to move the plungers toward the abutment and into engagement with the article, the carrier being adapted to move relatively to the plungers upon engagement of the individual plungers with the article, and means for selectively distributing the articles in accordance with the findings of the detecting mechanism.

21. In a machine of the class described, a plurality of plungers, a carrier for the plungers, springs operable to project the plungers from the carrier, a member formed to present a substantially plane surface toward which the plungers are adapted to be moved, means for operating the carrier to move the plungers toward the surface of the member and into engagement with an article interposed between the plungers and said member, the carrier being adapted to move relatively to the plungers upon engagement of the individual plungers with the article, and means for indicating the degree of difference between the maximum and minimum relative movements of the carrier and plungers.

22. In a machine for sorting flat imperforate articles, an article support, means for selectively distributing the articles, and mechanism for controlling the distributing means, said mechanism comprising a plurality of article-engaging detectors and a reciprocating carrier therefor and being constructed and arranged variably to control the distributing means upon successive engagement of the detectors with lateral faces of articles on the support.

23. In a machine for sorting imperforate articles, a plurality of article-engaging detectors, a reciprocating carrier therefor, the detectors being mounted on the carrier for movement relatively thereto to enable them to be moved by the carrier through varying distances under the control of the articles operated upon, means for operating the carrier, and means for grading the articles in accordance with the amount of differential movement of the detectors.

24. A machine for grading articles, having, in combination, means for determining the variation in a characteristic of an article at a plurality of locations, and means for utilizing such determination to store said article with others having a like variation in said characteristic.

25. A machine of the class described, having, in combination, means for determining the variation in a characteristic of an article at a plurality of locations, a movable member, and mechanism controlled by the determining means for positioning the movable member.

26. A machine of the class described having, in combination, means for determining the variation in thickness of a piece of shoe stock, a movable member, mechanism controlled by the determining means for positioning the movable member and means controlled by the movable member for performing another operation on the piece of stock.

27. In a machine of the class described, an indicator comprising two parts connected for movement in opposite directions, means operable on one of the parts to set the indicator in accordance with the determined character of an article, and means controlled by the other part for sorting articles.

28. In a machine of the class described, an indicator, an angularly movable member, a second member mounted for angular movement independently of the first-mentioned member, connections between said members for imparting movement of another character to one of the members upon relative angular movement of the members to set the indicator, and means for moving the members angularly.

29. In a machine of the class described, an indicator, a frame, a member rotatably mounted on the frame, a second member mounted for rotation relatively to the frame and the first-mentioned member, connections between said members for effecting endwise movement of one of said members upon relative rotation of the members to set the indicator, and means for rotating the members.

30. In a machine of the class described, an indicator, a frame, a member rotatably mounted on the frame, a second member mounted for rotation relatively to the frame and the first-mentioned member, connections between said members for effecting endwise movement of one of said members upon relative rotation of the members to set the indicator, and article-detecting mechanism operable to rotate the members.

31. In a machine of the class described, an indicator, an angularly movable member, a second member mounted for angular movement independently of the first-mentioned member, connections between said members for imparting movement of another character to one of the members upon relative angular movement of the members to set the indicator, and means for moving the members angularly in accordance with the maximum and minimum thickness of an article.

32. In a machine of the class described, an indicator, an angularly movable member, a second member mounted for angular movement independently of the first-mentioned member, connections between the members for imparting movement of another character to one of the members upon relative angular movement of the members to set the indicator, a plurality of detectors disposed for engagement with an article at spaced locations, and connections between the detectors and the members constructed to cause one of the members to be moved angularly in accordance with the maximum finding of the detectors and to cause the other of the members to be moved angularly in accordance with the minimum finding of the detectors.

33. In a machine of the class described, an indicator, a frame, a member rotatably mounted on the frame, a second member mounted for rotation relatively to the frame and the first-mentioned member, connections between said members for effecting endwise movement of one of the members upon relative rotation of the members to set the indicator, a plurality of detectors disposed for engagement with an article at spaced locations to ascertain the thickness of the article, connections between the detectors and one of the members constructed to cause the member to be moved angularly in accordance with the maximum finding of the detectors, and connections between the detectors and the other member constructed to cause the latter member to be moved angularly in accordance with the minimum finding of the detectors.

34. In a machine of the class described, a plurality of elements mounted for movement along substantially parallel lines, means for moving the elements in the same direction and in varying degrees, an indicator, and means for setting the indicator in accordance with the extent of differential movement of the elements.

35. In a machine of the class described, a plurality of elements mounted for movement along substantially parallel lines article-detecting means operable to move the elements in the same direction and in varying degrees, and means for grading articles in accordance with the amount of differential movement of the elements when the articles are operated upon by the detecting means.

36. In a machine of the class described, a plurality of elements mounted for movement along substantially parallel lines, a plurality of detectors disposed for engagement with an article at spaced locations to ascertain a characteristic of the article, means for operating the detectors, connections between each of the detectors and one of the elements for moving the element to an extent proportionate to the finding of the corresponding detector, an indicator, and means for setting the indicator in accordance with the amount of differential movement of the elements.

37. In a machine of the class described, a plurality of movable elements, a plurality of detectors disposed for engagement with an article at spaced locations to ascertain the thickness of the article, means for operating the detectors, connections between each of the detectors and one of the elements for moving the element to an extent proportionate to the finding of the corresponding detector, and means for distributing articles in accordance with the amount of differential movement of the elements when the articles are operated upon by the detectors.

38. In a machine of the class described, a plurality of movable elements, a like number of detectors disposed for engagement with an article at spaced locations, means for operating the detectors, connections between each of the detectors and one of the elements for moving the element to an extent proportionate to the finding of the corresponding detector, an indicator, and means for setting the indicator in accordance with the extent of differential movement of the elements, said means being constructed and arranged not to move the indicator upon common movement of the elements.

39. In a machine of the class described, a plurality of detectors disposed for engagement with an article at spaced locations to ascertain the thickness of the article, each of the detectors being movable to an extent proportionate to the thickness of the article at the point engaged by it, means for operating the detectors, an indicator, and means controlled by the detectors for setting the indicator in accordance with the amounts of differential movement of the detectors, said means being constructed and arranged not to move the indicator upon common movement of the detectors.

40. In a machine of the class described, a number of detectors greater than two disposed for engagement with an article at spaced locations to ascertain a characteristic of the article and movable to an extent proportionate to the value of their findings, means for operating the detectors, a plurality of movable elements corresponding in number to the detectors, connections between the detectors and the elements constructed to effect equal movement of the corresponding elements upon equal movements of the detectors, an indicator, and means for setting the indicator in accordance with the extent of differential movement of the elements, the construction being such that the indicator will be set in the same position when the variations between the maximum and minimum findings of the detectors are equal regardless of which of the detectors registers the maximum and which the minimum finding.

41. In a machine of the class described, a number of detectors greater than two disposed for engagement with an article at spaced locations to ascertain a characteristic of the article and movable to an extent proportionate to the value of their findings, a like number of movable elements, means for operating the detectors, actuators for the elements, levers of like leverage for connecting the detectors to the actuators so that equal movements of the detectors will effect equal movements of the actuators and of the corresponding elements, and means controlled by the elements for grading the articles operated upon in accordance with the differential movement of the elements, the construction being such that articles giving equal variations between the maximum and minimum findings of the detectors will be analogously graded regardless of which of the detectors registers the maximum finding and which the minimum finding.

42. In a machine of the class described, a plurality of movable elements, article-engaging means operable to move the elements through distances varying in accordance with the variation in a characteristic of an article, a member operatively connected with the elements and arranged for movement by any of them, a second member operatively associated with the elements, means for causing the second member to follow the elements in their movement so that said members will be separated by a distance corresponding to the amount of differential movement of the members, an indicator, and means for setting the indicator in accordance with the distance opened up between the members upon operation of the article-engaging means.

43. In a machine of the class described, an indicator, a pair of movable members, springs connecting the members and operable to move them toward each other, article detecting means, connections between the article detecting means and the members for separating the members in opposition to the springs to an extent proportionate to the findings of the detecting means, and means operated by said members for setting the indicator.

44. In a machine of the class described, means for determining the individual variation in thickness of each of a plurality of articles regardless of whether the articles are relatively thick or thin at a particular point, means for indicating such variation, and means for utilizing the indications to sort the articles.

45. In a machine for sorting flat articles, means for determining the individual variations in thickness of the flexible, flat articles, and means for thereafter storing the articles face to face in stacks, each stack being composed of articles having like thickness variations.

46. In a machine of the class described, means for determining the individual variations in thickness of a quantity of articles, means for indicating the thickness variation of each article, a series of selectors, and means controlled by the indicating means for operating a single selector in the series to store a single article.

47. In a machine of the class described, means for determining the individual variations in thickness of a quantity of articles, a series of indicators for recording the individual thickness variations of the articles, a series of selectors for storing the articles, a common actuator for the indicators and selectors, the selectors being normally disconnected from the actuator, and means controlled by the indicators for operatively connecting the selectors to the actuator.

48. In a machine of the class described, means for determining the individual variations in thickness of a quantity of articles, a series of indicators for recording the individual thickness variations of the articles, a series of selectors for storing the articles, a common actuator for the indicators and selectors, the selectors being normally disconnected from the actuator, means operated by the indicators for operatively connecting the selectors to the actuator, and means for voiding the effectiveness of an indicator after it has once operatively connected a selector to the actuator.

49. In a machine of the class described, a conveyor formed to provide a series of receptacles for holding articles, an indicator associated with each of the receptacles of the conveyor and movable with the conveyor, devices for actuating the indicators one at a time to indicate the individual thickness variations of the articles in the corresponding receptacles, a series of normally inactive selectors for storing the articles, means for operating the selectors, and means operated by the indicators for operatively connecting the selectors to the operating means.

50. In a machine of the class described, means for determining the individual variations in thickness of a quantity of articles, means for indicating the thickness variation of each article, a series of selectors for storing the articles, means controlled by the indicating means for operating a selector to store an article, and means for voiding the indication of the indicating means after it has once controlled the operation of a selector.

51. In a machine for grading flat articles, such as pieces of shoe stock and the like, article-engaging detecting mechanism, grading means, a member operatively connected to the detecting mechanism and tending normally to set the grading means in accordance with the thinnest spot of the article, and means controlled by the detecting mechanism for reducing the movement of said member below normal by an amount proportionate to the thickness of the article at its thickest spot so as to cause the grading means to be set in accordance with the thickness variation of the article.

52. In a machine for grading flat articles, such as pieces of shoe stock and the like, article-engaging detecting mechanism, grading means, a member operatively connected to the detecting mechanism and tending normally to set the grading means in accordance with the thinnest spot of the article, means controlled by the detecting mechanism for reducing the movement of said member below normal by an amount proportionate to the thickness of the article at its thickest spot, and means for rendering the last-named means operative or inoperative at will to enable the grading means to be set in accordance either with the thickness variation of the article or the thickness of the article at its thinnest spot.

53. In a machine for grading articles such as pieces of shoe stock and the like, article-engaging detecting means, an indicator, and means controlled by the detecting means for setting the indicator in accordance either with the variation in thickness of the article or its thickness at its thinnest spot.

54. In a machine of the class described, a conveyor formed to provide a series of receptacles each adapted to contain a single article in substantially horizontal position, article detecting mechanism movable in a substantially fixed path and comprising a plurality of detectors disposed for engagement with an article on the conveyor, means for operating the conveyor to present articles successively to the detecting mechanism, and means for discharging the articles from the conveyor at different points in accordance with the finding of the detecting mechanism.

55. In a machine for grading flat articles, such as pieces of shoe stock and the like, a carrier mounted for to and fro movement, means for operating the carrier, detectors supported on the carrier for movement therewith, article distributing means, and means operated by the detectors upon movement of the detectors by the carrier into engagement with an article for controlling the distributing means in accordance with the thinnest spot of the article.

56. In a machine for grading flat articles, such as pieces of shoe stock and the like, an article support, a plurality of article-engaging detectors, means common to the detectors for moving them into and out of engagement with a lateral face of an article on the support in directions transverse to the plane of the article, and means controlled by the detectors for distributing articles selectively in accordance with their thicknesses at their thinnest spots.

57. In a machine for grading flat articles, such as pieces of shoe stock and the like, an article support, detectors for operating on the articles, a carrier for the detectors mounted for movement to carry the detectors into and out of engagement with a lateral face of an article on the support in directions transverse to the plane of the article, and means controlled by the detectors for distributing articles selectively in accordance with their thicknesses at their thinnest spots.

58. In a machine for grading flat articles, such as pieces of shoe stock and the like, means for supporting an article, detectors for operating on the article while it is on the support, the support and the detectors being relatively constructed and arranged to cause the article to be maintained stationary with relation to the detectors during operation of the detectors on the article, a carrier for the detectors relatively to which the detectors are movable in accordance with the thickness of the article at the points engaged by them, and means controlled by the detectors for distributing articles selectively in accordance with their thicknesses at their thinnest spots.

59. In a machine for grading flat articles, such as pieces of shoe stock and the like, detecting means constructed and arranged to detect by pressure exerted in a direction transverse to the plane of an article a thin spot in the article, means for maintaining the detecting means and the article at their points of mutual engagement relatively stationary during the detecting operation, and means controlled by the detecting means for selectively distributing articles in accordance with their thicknesses at the thinnest spots engaged by the detecting means.

60. In a machine for grading flat articles, such as pieces of shoe stock and the like, detecting means constructed and arranged to detect by pressure exerted in a direction transverse to the plane of an article a thin spot in the article, means for maintaining the detecting means and the article at their point of mutual engagement relatively stationary during the detecting operation, means for automatically presenting articles successively to the detecting means, and means controlled by the detecting means for selectively distributing the articles in accordance with their thicknesses at the thinnest spots engaged by the detecting means.

61. In a machine for grading flat articles, such as pieces of shoe stock and the like, means for detecting the thinnest spot of an article at a plurality of locations adjacent to its edge, means for maintaining the article and the detecting means relatively stationary while the article is being operated upon by the detecting means, and means controlled by the detecting means for selectively distributing articles in accordance with their thicknesses at the thinnest spots engaged by the detecting means.

62. In a machine for grading flat articles, such as pieces of shoe stock and the like, an abutment arranged to overlie an article, independently movable article-engaging detectors operable to press the article upwardly against the abutment, and means for grading articles in accordance with their thicknesses at the thinnest spots engaged by the detectors.

63. In a machine for grading flat articles, such as pieces of shoe stock and the like, an abutment arranged to overlie an article, independently movable article-engaging detectors operable to press the article upwardly against the abutment, and means for selectively distributing articles in accordance with their thicknesses at the thinnest spots engaged by the detectors.

64. In a machine for grading flat articles, such as pieces of shoe stock and the like, a plurality of detectors, a carrier for the detectors, means for imparting to and fro movement to the carrier to carry the detectors into and out of engagement with an article, means for selectively distributing articles, and means for controlling the distributing means, said controlling means comprising a member arranged to be moved to an extent proportionate to the extent of movement of the detector which finds the thinnest spot of an article.

65. In a machine for grading flat articles, such as pieces of shoe stock and the like, a plurality of independently movable detectors for operating on an article, positively operated means operatively connected to the detectors for moving them into engagement with an article, means for selectively distributing articles, controlling means for the distributing means comprising a movable member, and connections between the detectors and the member for moving the member in accordance with the extent of movement of the detector which engages the thinnest spot of an article so that the articles are distributed in accordance with their thicknesses at their thinnest spots.

66. In a machine for grading flat articles, such as pieces of shoe stock and the like, article-engaging detecting means, grading means, controlling means for the grading means comprising a member movable endwise to set the grading means and arranged to be moved endwise in proportion to the degree of angular movement imparted to the member, and means for moving the member angularly to an extent determined by the thickness of an article at the thinnest spot engaged by the detecting means.

67. In a machine for grading flat articles, such as pieces of shoe stock and the like, a plurality of detectors, means for supporting the detectors, means for operating the support in timed relation to other moving parts of the machine to carry the detectors into engagement with an article, and means controlled by movement of the detectors toward the article for grading it in accordance with the thinnest spot of the article engaged by the detectors.

68. In a machine for grading flat articles such as pieces of shoe stock and the like, a plurality of detectors constructed and arranged to detect a thin spot in an article by pressure exerted on a lateral face of the article in directions transverse to the plane of the article, a support for the article constructed to constrain it against movement relatively to the detectors while it is being operated upon by the detectors, means operated in timed relation to other moving parts of the machine for moving the detectors into engagement with the article, and means controlled by the detectors for grading the article in accordance with the thinnest spot engaged by the detectors.

69. In a machine for grading flat articles, such as pieces of shoe stock and the like, a conveyor for the articles, detecting means constructed and arranged for engagement with the articles at a plurality of points, and means separate from the conveyor and responsive to the thicknesses of the articles at their thinnest spots for removing the articles from the conveyor at selected locations along the path of movement of the conveyor.

70. In a machine for grading flat articles, such as pieces of shoe stock and the like, means for moving articles in a determinate path, normally inoperative devices separate from the moving means and arranged adjacent to the path of movement of the articles, article-engaging detecting means, and means controlled by the detecting means for rendering the devices selectively operative to engage articles carried by the moving means and to remove them from said path at locations dependent upon the thicknesses of the articles at their thinnest spots, so that articles of substantially equal thickness at their thinnest spots are removed from the path at the same locations.

71. In a machine for grading flat articles such as pieces of shoe stock and the like, means for moving articles in a determinate path, normally inoperative devices separate from the moving means and arranged adjacent to the path of movement of the articles, article-engaging detecting means, and means controlled by the detecting means for causing the devices to be selectively operated to remove articles from said path at locations determined by the thicknesses of the articles at their thinnest spots.

72. In a machine for grading flat articles, such as pieces of shoe stock and the like, a conveyor for the articles, article-engaging detecting mechanism to which the conveyor is relatively movable arranged for operation on an article carried by the conveyor at one point in the path of movement of the conveyor, and means controlled by the detecting mechanism for causing the articles to be delivered from the conveyor at points along the path of movement of the conveyor dependent upon the thicknesses of the articles at the thinnest spots engaged by the detecting mechanism.

73. In a machine for grading flat articles, such as pieces of shoe stock and the like, article-engaging detecting mechanism, a conveyor movable to present articles to the detecting mechanism, means for moving the detecting mechanism toward and from the path of movement of the conveyor into and out of engagement with the articles, and means controlled by the detecting mechanism for distributing articles selectively from the conveyor in accordance with the thicknesses of the articles at their thinnest detected spots.

74. In a machine for grading flat articles, such as pieces of shoe stock and the like, a conveyor provided with a plurality of receptacles, each adapted to contain a single article, an indicator associated with each receptacle, detecting mechanism for operating on the articles while they are on the conveyor, means for setting the indicator associated with each receptacle in accordance with the thinnest spot of the contained article engaged by the detecting mechanism, and means for removing the articles from the conveyor at points in the path of movement of the conveyor dependent upon the positions in which the indicators have been set.

75. In a machine for grading flat articles, such as pieces of shoe stock and the like, a conveyor provided with a plurality of receptacles, each adapted to contain a single article, an indicator associated with each receptacle, a plurality of independently movable detectors for operating on the articles while they are on the conveyor, means for setting the indicator associated with each receptacle in accordance with the thinnest spot of the contained article engaged by the detectors, normally inoperative devices arranged along the path of movement of the conveyor for removing articles from the conveyor, and means operated by the indicators for rendering said devices selectively operative to remove the articles from the conveyor at different points along its path determined by the positions in which the indicators have been set.

76. In a machine for grading flat articles, such as pieces of shoe stock and the like, detecting means operable on an article at a plurality of points within a determinate area of the article, means for grading the article in accordance with the thickness of the article at the thinnest point engaged by the detecting means, and means for rendering the detecting means inoperative on a point within said area to cause the grading means to be set in accordance with the thickness of the article at the thinnest of the remaining points.

77. In a machine for grading flat articles, such as pieces of shoe stock and the like, grading means, and means constructed and arranged to be rendered operable at the will of the operator to set the grading means either in accordance with the thinnest of a plurality of points disposed both adjacent to the edge of the article and interiorly of the article or in accordance with points adjacent to the edge of the article only.

78. In a machine of the class described, means for detecting a physical characteristic of articles, means for grading the articles in accordance with the value of such characteristic, and means for insuring that only articles of standard uniformity in respect of the characteristic will be presented to the detecting means.

79. In a machine of the class described, means for detecting a physical characteristic of articles, means for grading the articles in accordance with the value of such characteristic, means for insuring that only articles of standard uniformity in respect to the characteristic will be presented to the detecting means, and means for varying the standard by which the articles are or are not presented to the detecting means.

80. In a machine of the class described, means for detecting a physical characteristic of articles relative to their contour, means for distributing the articles in accordance with the value of such characteristic, a supply station, and mechanism intermediate between the supply station and the detecting means for determining whether the articles to be operated upon by the detecting means are of standard character with regard to their contour and for preventing the delivery to the detecting means of articles not of standard character.

81. In a machine of the class described, means for testing articles, means separate from the testing means and controlled by the testing means for removing certain of the articles from the field of operation of the machine, means for detecting a physical characteristic of the remaining articles, and means for grading such articles in a plurality of classifications in accordance with the finding of the detecting means.

82. In a machine of the class described, means for grading articles in accordance with their thicknesses, and means for determining the individual variations in thickness of the articles prior to their delivery to the grading means.

83. In a machine of the class described, means for grading articles in accordance with their thicknesses, devices for determining the individual variations in thickness of the articles, a conveyor for transporting the articles from the devices toward the grading means, and means for causing only articles of substantially uniform thickness to be delivered to the grading means by the conveyor.

84. In a machine of the class described, means for grading articles in accordance with their thicknesses, devices for determining the individual variations in thickness of the articles, means for conveying the articles from the devices toward the grading means, and mechanism for removing articles which vary in thickness beyond a predetermined standard from the conveying means so as to prevent their delivery to the grading means, said mechanism being constructed and arranged to remove articles having greater thickness variation from the conveying means before articles having less thickness variation.

85. In a machine of the class described, a detector for ascertaining the thickness of an article at one location and a plurality of devices disposed for engagement with the article at spaced locations to determine the variation in thickness of the article at such locations.

86. In a machine of the class described, a plurality of devices operable on an article at spaced locations to determine the amount of variation of the article with respect to a physical characteristic of the article, means for distributing articles which vary in said characteristic beyond a predetermined standard, and means for operating on articles ascertained to be of standard character with respect to said characteristic to determine the value of the characteristic.

87. In a machine of the class described, a rotary carrier formed to provide a series of receptacles adjacent to its periphery, mechanisms co-operating with the carrier at different points in the path of movement of the receptacles for testing articles in the receptacles and means interposed between said mechanisms for distributing the articles.

88. In a machine of the class described, a conveyor, devices co-operating with the conveyor at one point in its path of movement to determine the individual variations of articles on the conveyor in respect of a physical characteristic of the articles, an indicator controlled by the devices, a detector co-operating with the conveyor at another point in its path to ascertain the value of the characteristic of the article, and an indicator controlled by the last mentioned device.

89. In a machine of the class described, a conveyor constructed to provide a series of receptacles for articles to be operated upon, devices co-operating with the conveyor at one point in its path of movement to determine the individual variations of the articles on the conveyor in respect of a physical characteristic of the articles, a detector co-operating with the conveyor at another point in its path of movement to ascertain the value of the characteristic of the article, a plurality of indicators associated with each of the receptacles for movement with the conveyor, certain of the indicators being controlled by the first-mentioned devices and certain other of the indicators being controlled by the last-mentioned device.

90. In a machine of the class described, a conveyor having a plurality of receptacles for articles to be operated upon, a plurality of indicators associated with each receptacle and movable with the conveyor independent means for testing the articles and setting the indicators, and a plurality of sets of mechanisms for distributing the articles from the conveyor, the members of one set of mechanisms being constructed and arranged to be selectively operated by one of the indicators associated with a receptacle of the conveyor, and the members of the other set being constructed and arranged to be selectively operated by another of the indicators associated with the receptacle.

91. In a machine of the class described, a conveyor having a plurality of receptacles for articles to be operated upon, a plurality of indicators associated with each receptacle and movable with the conveyor, means for determining the variation in thickness of an article in a receptacle of the conveyor and setting one of the indicators associated with the receptacle in accordance with the determination, and means for detecting the thickness of the article at one location and setting another of the indicators associated with the receptacle in accordance therewith.

92. In a machine of the class described, a conveyor having a plurality of receptacles for articles to be operated upon, a pair of indicators associated with each receptacle and movable with the conveyor, means for determining the variation in thickness of an article in a receptacle of the conveyor and setting one of the indicators associated with the receptacle in accordance with the determination, means for detecting the thickness of the article at one location and setting the other indicator associated with the receptacle in accordance therewith, and a plurality of sets of mechanisms for distributing the articles from the conveyor, the members of one set of mechanisms being constructed and arranged to be selectively operated by the first-mentioned indicator, and the members of the other set being constructed and arranged to be selectively operated by the last-named indicator.

93. In a machine of the class described, a conveyor having a plurality of receptacles for articles to be tested, a pair of indicators associated with each receptacle and movable with the conveyor, means for determining the individual variations in thickness of articles on the conveyor and for setting one of the indicators associated with each receptacle in accordance with the determination, means controlled by the first-mentioned indicators for removing from the conveyor articles which vary in thickness beyond a certain standard, means for detecting the thicknesses of the articles which remain on the conveyor and for setting the other indicators in accordance with the ascertained thicknesses of the articles, and means controlled by the last-named indicators for distributing such articles.

94. In a machine of the class described, a conveyor formed to provide a plurality of receptacles each adapted to contain a single article means for grading articles on the conveyor, a supply station, means intermediate the supply station and the grading means for testing articles and removing from the conveyor articles not of standard character, and a second supply station intermediate between the testing and removing means and the grading means to enable articles to be supplied to the receptacles of the conveyor in replacement of those removed, prior to the presentation of the receptacles in the field of operation of the grading means.

95. In an apparatus of the class described, mechanism constructed to provide a fixed gaging surface arranged for engagement with one side of an article and means arranged for engagement with the opposite side of the article and coacting with said gaging surface to determine the variation in thickness of the article.

96. In an apparatus of the class described, mechanism constructed to provide a gaging surface and means co-acting with the gaging surface to indicate the variation in thickness of an article, said means comprising a plurality of like detecting elements.

97. In an apparatus of the class described, mechanism constructed to provide a gaging surface arranged to have one side of a generally flat article laid against it and means for determining the variation in thickness of the article, said means comprising a plurality of detecting elements movable toward and from the article and arranged to engage it at spaced points.

98. In an apparatus of the class described, a frame, detecting mechanism comprising a plurality of detectors arranged for engagement with an article at spaced points, each of said detectors being mounted on the frame for movement relatively to the frame and to other of the detectors, and means controlled by the detectors for indicating the difference in thickness of the article at the points engaged by them.

99. In an apparatus of the class described, a frame, detecting mechanism comprising a plurality of detectors arranged for engagement with an article at spaced points, each of said detectors being mounted on the frame for movement relatively to the frame and other of the detectors and being movable to an extent in accordance with the thickness of the article at the point engaged by it, and means for indicating the extent of relative movement of the detectors.

In testimony whereof I have signed my name to this specification.

JAMES G. NORTON.